(12) United States Patent
Donohoe et al.

(10) Patent No.: US 12,456,223 B2
(45) Date of Patent: Oct. 28, 2025

(54) SYSTEM AND METHOD FOR MAXIMIZING INFERENCE ACCURACY USING RECAPTURED DATASETS

(71) Applicant: UBOTICA TECHNOLOGIES LIMITED, Dublin (IE)

(72) Inventors: David Donohoe, Dublin (IE); Aubrey Dunne, Dublin (IE)

(73) Assignee: UBOTICA TECHNOLOGIES LIMITED, Dublin (IE)

( * ) Notice: Subject to any disclaimer, the term of this patent is extended or adjusted under 35 U.S.C. 154(b) by 283 days.

(21) Appl. No.: 17/963,882

(22) Filed: Oct. 11, 2022

(65) Prior Publication Data

US 2023/0120604 A1 Apr. 20, 2023

Related U.S. Application Data

(60) Provisional application No. 63/255,681, filed on Oct. 14, 2021.

(51) Int. Cl.
*H04N 23/63* (2023.01)
*G06T 7/80* (2017.01)
*H04N 23/60* (2023.01)

(52) U.S. Cl.
CPC ............. *G06T 7/80* (2017.01); *H04N 23/633* (2023.01); *H04N 23/64* (2023.01); *G06T 2207/20081* (2013.01); *G06T 2207/20084* (2013.01)

(58) Field of Classification Search
CPC ................. H04N 23/633; G06T 7/80
See application file for complete search history.

(56) References Cited

U.S. PATENT DOCUMENTS

| | | | | |
|---|---|---|---|---|
| 10,311,570 B1 * | 6/2019 | Podilchuk | ............... | G06V 10/82 |
| 10,977,554 B2 * | 4/2021 | Rabinovich | .......... | G06V 10/454 |
| 11,023,850 B2 * | 6/2021 | Fisher | ..................... | G06T 7/292 |
| 2019/0253615 A1 * | 8/2019 | Fukuya | ................... | G10L 15/22 |
| 2020/0265567 A1 * | 8/2020 | Hu | ............................ | G06T 5/50 |

OTHER PUBLICATIONS

Extended European Search Report received from the European Patent Office in related application No. 22201221.3-1208 dated Mar. 13, 2023.
Dunne, "Calibration of Non-Conventional Imaging Systems", Thesis Submitted for the Degree of Doctor of Philosophy, Dublin City University School of Engineering, 210 pages, (Jun. 2009).
Afifi, et al., "What Else Can Fool Deep Learning? Addressing Color Constancy Errors on Deep Neural Network Performance", arXiv:1912.06960v1 [cs.CV], 10 pages, (Dec. 15, 2019).

* cited by examiner

*Primary Examiner* — Michael H Hong
(74) *Attorney, Agent, or Firm* — The Marbury Law Group, PLLC

(57) ABSTRACT

The system and methods of the various embodiments enable convolutional neural networks to be trained for improved accuracy for a particular class of cameras, where the training is performed on one or more pre-existing datasets by recapturing the existing datasets using one or more cameras of the same class. Further, the system and methods of the various embodiments enable the accuracy of a convolutional neural network to be evaluated after it has been deployed on a target device, using a hardware-in-the-loop approach to validation.

20 Claims, 22 Drawing Sheets

SYSTEM AND METHOD FOR MAXIMIZING INFERENCE ACCURACY USING RECAPTURED DATASETS

RELATED APPLICATIONS

This application claims the benefit of priority to U.S. Provisional Application No. 63/255,681, entitled "System and Method for Maximizing Inference Accuracy using Recaptured Datasets" filed Oct. 14, 2021, the entire contents of which are hereby incorporated by reference for all purposes.

BACKGROUND

State-of-the-art performance and accuracy for a wide range of computer vision problems is achieved today through the use of convolutional neural networks. Images captured by a camera are fed into the network that can infer information from the image, such as the presence and location of any interesting objects, or a classification score that may be used to identify the type of any objects that may be present.

An Image Signal Processor (ISP) is typically deployed in a device to convert images coming from a camera sensor, into a format suitable for viewing. ISP functionality may include interpolation (the process of converting a raw image where red, green and blue samples are not available at each pixel location into a full RGB image), noise reduction, vignetting correction, color correction and sharpening. The output from the ISP is generally in some standard image format, such as Standard Red Green Blue (sRGB). The processed images may be shown on a display, or encoded as compressed still images or as a video stream, to be stored or streamed across a network.

Since sRGB is a well-established standard, convolutional neural networks are generally trained using datasets, such as ImageNet or CoCo, which are in sRGB format. Consequently, the images fed to the device at inference time should also be in sRGB format. The most common practice today is to process the images coming from the camera in the traditional way for visual consumption, feeding the output of the ISP into the network to perform inference. Even in applications where visual-quality images are not required, use of an ISP is the most common way of converting the raw camera output into sRGB format for consumption by the network. ISPs have traditionally been developed to target the best possible visual image quality (the field of image signal processing was well established before convolutional neural networks became ubiquitous). However, there is no reason to assume that an ISP optimized for visual image quality will also produce images that are better suited for inference accuracy.

A barrier to feeding the raw camera output directly to the inference network is that the inference network should be trained using images in the same raw format. However, datasets may contain millions of images, and they are extremely expensive to acquire.

A traditional ISP is designed to produce images for human visual consumption. Its purpose is to remove noise and other artifacts (such as chromatic aberration) that may be visually objectionable or distracting. It must produce an image with levels of sharpness and contrast such that the scene looks natural, and detail is clearly visible. Artifact and noise removal must be performed without degrading details or texture in the image, and without making the image look unnatural.

While it is generally not possible for an ISP to add information to an image, it is virtually impossible for an ISP to meet its objectives, in terms of visual image quality, without removing information. Yet, removing or degrading any details or texture from an image prior to performing inference may lead to a degradation in inference accuracy. For these and other reasons, traditional image processors (e.g., ISPs, etc.) are not suitable for processing images prior to inference. Indeed, only operations that do not remove information (e.g., subtracting the black pedestal or black level, etc.) should be contemplated when pre-processing the camera data prior to inference.

SUMMARY

The various aspects include methods of tailoring a neural network model to a camera, which may include obtaining, by a processor in a control device, an existing dataset of images, performing calibration operations, displaying images in the existing dataset of images on an electronic display, generating a recaptured dataset of images by capturing images of the displayed images via the camera, and training the neural network model based on the recaptured dataset of images.

Some aspects may further include deploying the trained neural network model to the camera. In some aspects, displaying the images in the existing dataset of images on the electronic display may include causing a display computer to display the images in the existing dataset of images on an electronic display of the display computer, and generating the recaptured dataset of images by capturing images of the rendered images via the camera may include causing a camera device to capture the images of the displayed images.

In some aspects, performing the calibration operations may include performing exposure calibration operations that include displaying a first image on the electronic display, capturing an image of the displayed first image, determining a number of overexposed pixels included in the captured image, determining whether the number of overexposed pixels included in the captured image is within a target range, adjusting one or more camera exposure parameters in response to determining that the number of overexposed pixels is not within the target range, and sending the adjusted camera exposure parameters to the camera for future image captures.

In some aspects, performing the calibration operations may include performing geometric calibration operations that include displaying a first image on the electronic display, capturing an image of the displayed first image, overlaying the captured image with a marker, and adjusting a position or orientation of the camera relative to the electronic display so that the marker in the captured image is aligned with a center of the electronic display.

Some aspects may further include generating a synthetic calibration image, displaying the synthetic calibration image on the electronic display, capturing and storing an image of the displayed synthetic calibration image, using the captured image of the displayed synthetic calibration image to generate a coarse geometric mapping, generating a camera mesh based on the coarse geometric mapping, and generating a display mesh by inverting the generated camera mesh.

In some aspects, displaying the images in the existing dataset of images on the electronic display and generating the recaptured dataset of images by capturing the images of the displayed images via the camera may include using an image identifier to identify an image in the existing dataset of images, retrieving the requested image from the existing dataset of images using the received image identifier, generating a warped image by using a camera mesh to warp the retrieved image, displaying the warped image, capturing an image of the displayed warped image, cropping the captured image of the displayed warped image, and saving the cropped image to the recaptured dataset of images.

In some aspects, displaying the images in the existing dataset of images on the electronic display and generating the recaptured dataset of images by capturing the images of the displayed images via the camera may include retrieving an image from the existing dataset of images, generating a warped image by using a camera mesh to warp the retrieved image, rendering the warped image and an encoded frame identifier over the warped image, displaying the warped image and the encoded frame identifier, capturing an image of the warped image and the encoded frame identifier, decoding the encoded frame identifier, using the decoded frame identifier to retrieve image metadata, cropping the captured image of the warped image, and saving the cropped image to the recaptured dataset of images.

In some aspects, displaying the warped image and the encoded frame identifier may include displaying and recapturing images at a rate of up to half of a frame rate of the camera. Some aspects may further include varying physical parameters of the camera, selecting a subset of images from the existing dataset of images, displaying the subset of images on the electronic display, generating the recaptured dataset of images by capturing the images of the displayed images via the camera, and training the neural network model based on the recaptured dataset of images.

In some aspects, varying the physical parameters of the camera may include using a different sensor gain in the camera, and training the neural network model based on the recaptured dataset of images may include retraining at least one earlier layer in the neural network model, and freezing all other layers of the neural network model. In some aspects, generating the recaptured dataset of images by capturing the images of the displayed images via the camera may include capturing two images of a single displayed image using different exposures, scaling at least one of the captured two images, and merging the captured two images.

In some aspects, varying the physical parameters of the camera may include using a different focus in the camera, and training the neural network model based on the recaptured dataset of images may include retraining at least one earlier layer in the neural network model, and freezing all other layers of the neural network model.

In some aspects, varying the physical parameters of the camera may include using a different camera. Some aspects may further include displaying a synthetic color calibration chart on the electronic display, capturing an image of the displayed synthetic color calibration chart via the camera, illuminating a physical instance of the synthetic color calibration chart with a target illuminant, capturing an image of the physical instance of the synthetic color calibration chart via the camera, determining a set of per-channel gains that best maps colors from the image of the synthetic color calibration chart to the colors from the image of the physical instance of the synthetic color calibration chart, and applying the set of per-channel gains to at least one image in the recaptured dataset of images.

Some aspects may further include retrieving an image from the existing dataset of images, generating a warped image by using a camera mesh to warp the retrieved image, rendering the warped image and an encoded frame identifier over the warped image, displaying the warped image and the encoded frame identifier, capturing an image of the warped image and the encoded frame identifier, generating an inference result by performing inference on the captured image of the warped image, decoding the encoded frame identifier, using the decoded frame identifier to retrieve an expected inference result from the existing dataset of images, determining an inference accuracy value by comparing the generated inference result and the expected inference result, and updating at least one global accuracy value based on the determined inference accuracy value.

Further aspects may include a computing device (e.g., display computer, control computer, camera, etc.) having a processor configured with processor-executable instructions to perform various operations corresponding to the methods discussed above.

Further aspects may include a computing device having various means for performing functions corresponding to the method operations discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DESCRIPTION

Figure 1:
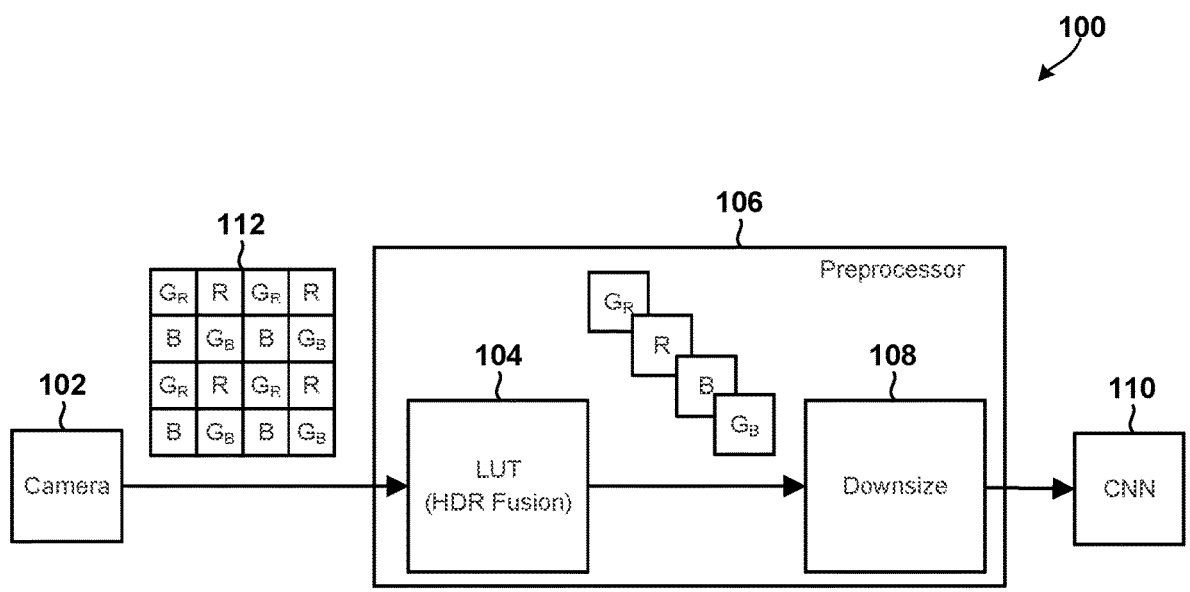
FIG. 1 is process flow diagram showing a system that performs minimal processing on raw images coming from a camera sensor.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration". Any implementation described herein as "exemplary" is not necessarily to be construed as preferred or advantageous over other implementations.

The term "computing device" may be used herein to refer to any one or all of server computing devices, personal computers, laptop computers, tablet computers, edge devices, user equipment (UE), multimedia Internet enabled cellular telephones, smartphones, smart wearable devices (e.g., smartwatch, smart glasses, fitness tracker, clothes, jewelry, shoes, etc.), Internet-of-Things (IoT) devices (e.g., smart televisions, smart speakers, smart locks, lighting systems, smart switches, smart doorbell cameras or security systems, etc.), connected vehicles, and other similar devices that include a memory and programmable processor for providing the functionality described herein.

The term "AI model" may be used herein to refer to a wide variety of information structures that may be used by a computing device to perform a computation or evaluate a specific condition, feature, factor, dataset, or behavior on a device. Examples of AI models include network models, neural network models, inference models, neuron models, classifiers, random forest models, spiking neural network (SNN) models, convolutional neural network (CNN) models, recurrent neural network (RNN) models, deep neural network (DNN) models, generative network models, and genetic algorithm models. In some embodiments, an AI model may include an architectural definition (e.g., the neural network architecture, etc.) and one or more weights (e.g., neural network weights, etc.).

The terms "collected data", "acquired data", "sensed data", and "measured data" may all be used herein to refer to data acquired by a device (e.g., images from a camera, etc.). Further, a "dataset" may include a multitude of images.

The terms "image" and "frame" may both be used herein to refer to visual data acquired by a camera device. An image may include a multitude of color channels and pixels.

The term "neural network" may be used herein to refer to an interconnected group of processing nodes (or neuron models) that collectively operate as a software application or process that controls a function of a computing device and/or generates an overall inference result as output. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input data and output data. A neural network may learn to perform new tasks over time by adjusting these weight values. In some cases, the overall structure of the neural network and/or the operations of the processing nodes do not change as the neural network learns a task. Rather, learning is accomplished during a "training" process in which the values of the weights in each layer are determined. As an example, the training process may include causing the neural network to process a task for which an expected/desired output is known, comparing the activations generated by the neural network to the expected/desired output, and determining the values of the weights in each layer based on the comparison results. After the training process is complete, the neural network may begin "inference" to process a new task with the determined weights.

The term "inference" may be used herein to refer to a process that is performed at runtime or during execution of the software application program corresponding to the neural network. Inference may include traversing the processing nodes in the neural network along a forward path to produce one or more values as an overall activation or overall "inference result."

The term "deep neural network" may be used herein to refer to a neural network that implements a layered architecture in which the output/activation of a first layer of nodes becomes an input to a second layer of nodes, the output/activation of a second layer of nodes becomes an input to a third layer of nodes, and so on. As such, computations in a deep neural network may be distributed over a population of processing nodes that make up a computational chain. Deep neural networks may also include activation functions and sub-functions between the layers. The first layer of nodes of a multilayered or deep neural network may be referred to as an input layer. The final layer of nodes may be referred to as an output layer. The layers in-between the input and final layer may be referred to as intermediate layers.

The term "convolutional neural network" (CNN) may be used herein to refer to a deep neural network in which the computation in at least one layer is structured as a convolution. A convolutional neural network may also include multiple convolution-based layers, which allows the neural network to employ a very deep hierarchy of layers. In convolutional neural networks, the weighted sum for each output activation is computed based on a batch of inputs, and the same matrices of weights (called "filters") are applied to every output. These networks may also implement a fixed feedforward structure in which all the processing nodes that make up a computational chain are used to process every task, regardless of the inputs. In such feed-forward neural networks, all of the computations are performed as a sequence of operations on the outputs of a previous layer. The final set of operations generate the overall inference result of the neural network, such as a probability that an image contains a specific object (e.g., a person, cat, watch, edge, etc.) or information indicating that a proposed action should be taken.

The term "classifier" may be used herein to refer to an AI model and/or information structures that may be used by a device processor to evaluate collected data or a specific feature (or factor, condition, data point, operation, component, etc.). For example, a classifier may include decision nodes (e.g., neural networks, decision stumps, boosted decision trees, etc.) that each include a weight value and a test question/condition suitable for evaluating the collected data.

The term "camera mesh" may be used herein to refer to a dense mesh of coordinates (e.g., (x,y) coordinates, etc.) with one element per pixel of a captured camera frame. The coordinates themselves may address pixels of the display. The mesh may provide a mapping from camera pixels back to the display pixels from which the content originated.

The terms "control computer" and "controlling computer" may be used interchangeably herein to refer to a computing device that is configured to manage and coordinate the calibration and recapture processes. The computing device may also be configured to receive frames captured by a camera device and initiate the display of images on a display device for calibration and recapture.

The terms "display computer" and "display controller" may be used interchangeably herein to refer to a computing device that is configured to display images for calibration or recapture. In some embodiments, the computing device may also include an integrated display device. In other embodiments, the display device may be an external device such as a TV or monitor that is coupled to the computing device. In some embodiments, the same computing device may include both a display computer and a control computer.

The term "display mesh" may be used herein to refer to dense mesh of coordinates (e.g., (x,y) coordinates, etc.) with one element per pixel of a displayed frame. The coordinates themselves may address pixels of a captured camera frame. The mesh may provide a mapping from display pixels to the camera pixels where the corresponding content will end up when captured.

The term "frame ID" may be used herein to refer to an identifier, such as an integer value, which uniquely identifies a particular image in an image dataset.

The term "ISP" may be used herein to refer to an image signal processor. A traditional ISP processes raw images from a camera sensor and performs operations such as CFA interpolation (also referred to as demosaicing), noise reduction, color correction, and conversion to a standard color space such as sRGB.

The term "preprocessor" may be used herein to refer to a minimal, lightweight, or low-energy consumption image processing block that processes images coming from the sensor prior to performing inference, which may take the place of a traditional ISP in some embodiments.

The terms "image quality" and "visual image quality" may be used herein to refer to quality of an image when evaluated using subjective or objective criteria. Objective criteria may be modulation transfer function (MTF) for measuring image resolution, or signal to noise ratio (SNR) for quantifying the amount of noise in an image. These metrics may be calculated algorithmically from images of special charts. Subjective criteria may be used to evaluate how an image is perceived by the human visual system. Evaluating image quality using subjective criteria may involve one or more human observers providing their opinions. Examples of subjective criteria include: do the textures in the image look natural?; does the image look sharp or blurry?; are colors realistic and natural looking?; does the image contain noticeable/distracting noise, or other noticeable artifacts?; does the image have good contrast, or does it look hazy?; and is the image well illuminated or too dark/bright? Images used for inference do not necessarily need to yield good image quality metrics, and the images could look quite unnatural to a human observer.

The terms "total exposure" and "total sensitivity" may be used herein to refer to the brightness of an image output by an imaging sensor. It is mainly affected by two controllable parameters: the exposure time and the gain. The gain may be applied in the analog domain, in the digital domain, or a combination of both domains. Total exposure may be defined as the exposure time multiplied by the gain.

The various embodiments enable existing datasets, in standard image formats, to be converted to a raw camera format. This may be achieved by using the actual camera to generate the raw dataset, thereby using the exact same optics and sensor to generate the images. The images may be captured just as they would be by the camera at inference time while the device was operating in the field. The derived dataset may then be used to train a network that has been modified (or designed) to consume images coming from the camera with minimal or no intermediate processing. Thus, the various embodiments present as much information as possible to the network and allow the training procedure to learn a better way to extract the available information from the original raw image data.

Others have attempted to solve the problem of creating a dataset of images in raw camera format, such as by using an inverse model of the ISP. This model tries to undo some very complex processing, such as tone mapping and interpolation, to produce a version of the image in raw camera format. Noise and other imperfections may be added to the resulting raw image to simulate behaviors of the camera sensor. However, using conventional solutions, it is extremely challenging to reliably produce images that have the same characteristics and data distributions as images that were captured by the actual camera that is going to be deployed.

FIG. 1 is block diagram illustrating components and operations in a system 100 that could be configured to perform minimal processing on raw images coming from a camera sensor in accordance with some embodiments. In the example illustrated in FIG. 1, the system 100 includes a camera 102 sensor, a convolutional neural network (CNN) 110 component, and a preprocessor 106 that includes lookup table (LUT) 104 component and a downsize 108 component. The processing may be performed by the preprocessor 106, which may operate upstream of the CNN 110 component.

In operation, the camera 102 sensor may capture an image and send the image and its corresponding dataset to the preprocessor 106. The preprocessor 106 may apply black level subtraction and a gamma adjustment to the image. Both operations may be applied simultaneously, using a simple LUT 104. The LUT 104 may allow the preprocessor 106 to apply, in a single step, the minimal image signal processing that is necessary for subsequent neural network inference on the dataset. Performing black level subtraction and applying a gamma (or tone curve) adjustment may improve the accuracy of the neural network inference or dataset. If the camera 102 is running in a high dynamic range (HDR) mode, a HDR fusion stage may be used to merge multiple exposures into a single high dynamic range image.

The preprocessor 106 may also planarize the raw image, separating out the individual channels of the image into planes, in accordance with the color filter array (CFA) pattern of the sensor. FIG. 1 illustrates this process for a Bayer CFA, which has four color channels (i.e., two green ($G_R$, $G_B$), one red (R) and one blue (B)), in a 2×2 pixel arrangement 112.

The downsize 108 component of the preprocessor 106 may resize the planes horizontally and vertically to create a multi-channel tensor of the size expected by the network.

It should be understood that the order of operations described above with reference to FIG. 1 may be changed without any effective change in the behavior of the system 100. For example, it would be valid to perform black level subtraction and gamma adjustment after the downsize operation. Indeed, the computational efficiency of the system 100 may be improved by changing the order of the operations for certain sizes of images produced by the camera 102. For example, if the images from the camera 102 (or the region of interest within those images on which inference is to be performed) are larger than the CNN's 110 input tensor size, then the images need to be downsized, and therefore it may be more efficient to perform these operations after the images have been downsized. However, if the images need to be upsized, then it may be more efficient to perform these operations prior to upsizing, since fewer pixels need to be modified. As such, the various embodiments may be configured to change the order of operations based on whether the images need to be upsized or downsized.

In some embodiments, the input layer of a convolutional neural network (e.g., CNN 110) may be configured to accept a 3-channel tensor (for RGB data) as the dataset. To work with raw camera data, the input layer may be modified to receive the number of channels that are to be extracted from the raw camera image. For example, for the popular Bayer CFA, 4 channels need to be extracted: red (R), blue (B), green on red lines ($G_R$), and green on blue lines ($G_B$). Other color filter arrays with different pixel layouts may also be supported, including those that have clear (also known as panchromatic) pixels, and those that have infrared pixels. The total number of elements in the input tensor will normally match the number of pixel elements in the camera sensor, although some channels (such as an infrared channel) could be ignored, resulting in a smaller input tensor. Equally, there may only be a single raw channel from the sensor.

Figure 2:
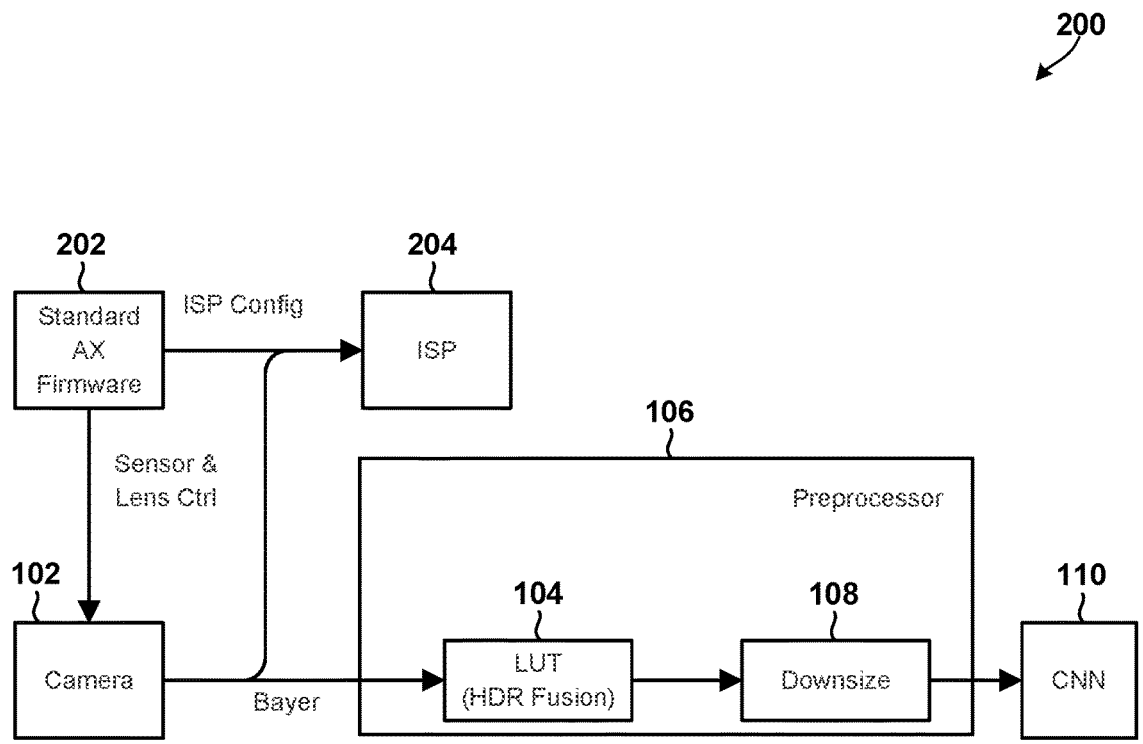
FIG. 2 is a process flow diagram showing a system that produces both visual imagery in addition to performing inferencing.

FIG. 2 is block diagram illustrating components and operations in a system 200 that could be configured to perform minimal processing on raw images coming from a camera sensor in accordance with some embodiments. In the example illustrated in FIG. 2, the system 200 includes a standard AX firmware 202 component that performs automated algorithms (e.g., auto exposure, auto focus, auto white balance, auto noise reduction), an image signal processor (ISP) 204, a camera 102 sensor, a preprocessor 106, a lookup table (LUT) 104 component, a downsize 108 component, and a convolutional neural network (CNN) 110 component.

There may be a requirement to produce visual imagery in addition to performing inferencing on the images output by the camera 102. Some embodiments, such as the system 200 illustrated in FIG. 2, may be configured to satisfy this requirement while still performing minimal processing on the dataset or input to the inference network. In the example illustrated in FIG. 2, the only configuration parameters shared between the inference processing and visual image signaling processing are settings that affect the camera 102 operations (including sensor related settings such as exposure control) and lens/optics settings (such as focus control). Configuration parameters affecting the ISP 204 do not affect the CNN inferencing path (e.g., between the camera 102, LUT 104, downsize 108 and CNN 110, etc.). The raw image stream may be split directly at the output of the camera 102 and processed independently from there on.

The various embodiments may provide portability benefits because they may be implemented on a wide range of hardware, including on systems that do not have the computational resources or specialized hardware required to perform image signal processing at high pixel rates.

The various embodiments may reduce the deployment effort required. Image signal processors (ISPs) tend to have many parameters that need to be tuned in order to achieve the desired visual image quality. This process is notoriously time consuming and needs to be repeated for many different lighting conditions (different Lux levels and illuminant color temperatures). Additionally, it usually needs to be done by highly specialized image quality engineers. In the case where visual imagery is not required, this entire process may be skipped. In the case where visual imagery is required, the visual image quality tuning may be performed in the traditional way, without having to consider how the image signal processing parameters might impact inference accuracy. Further, inferencing capabilities may be added to an existing system without the need to revisit the image signal processing parameter tuning. Another benefit is that image quality engineers tuning the image signal processors (e.g., ISP 204, etc.) for visual image quality may focus on that task without needing to consider how an inference network might perform on the image signal processor output.

The various embodiments may provide increased accuracy. For example, the various embodiments may enable the recovery of 75% of the accuracy lost when migrating a lab model to an embedded deployment. Since no information is removed from the images coming from the camera prior to feeding them into the inference network, improved accuracy may be achieved. Further, the network may be trained to perform better and more efficiently using images captured by the camera device itself.

The various embodiments are applicable to many types of cameras, in addition to those that employ Bayer color filter arrays in order to derive color information from the captured scene. They may also be applicable to monochrome sensors (e.g., where a color filter array is not present and color information is not available, etc.).

The various embodiments may be applicable to multi-aperture cameras, such as stereo cameras. For example, if a neural network were used to infer depth information from image pairs taken with a stereo camera, the embodiments described herein could be used to train such a neural network.

The various embodiments may be used with array cameras, where the scene is captured simultaneously by multiple cameras with varying characteristics such as spectral sensitivities, presence or absence of a color filter arrays, and color filter array pixel arrangement.

The various embodiments may be used with hyperspectral cameras and multi-spectral cameras, such as cameras that capture Near-Infrared (NIR) light in addition to light within the visible spectrum.

The various embodiments may be used with video by operating on each individual frame.

In order to train an inference network that has a modified input layer to achieve improved accuracy on the images from a given type of camera, it should be trained on a dataset of images coming from the same type of camera. A training dataset may exist that is suitable for the inference task that the network needs to perform. However, such datasets are typically in standard image formats, such as sRGB. The recapturing processes performed by some embodiments may include displaying each image from the dataset on a display device, photographing it with a camera, and saving the raw camera output to a storage device. In this way, a derivative dataset may be generated that is suitable for training the modified inference network. The recapture method may ensure that there is a one-to-one mapping between pixels from the original dataset images, and images from the recaptured dataset, in a geometric or spatial sense.

Figure 3:
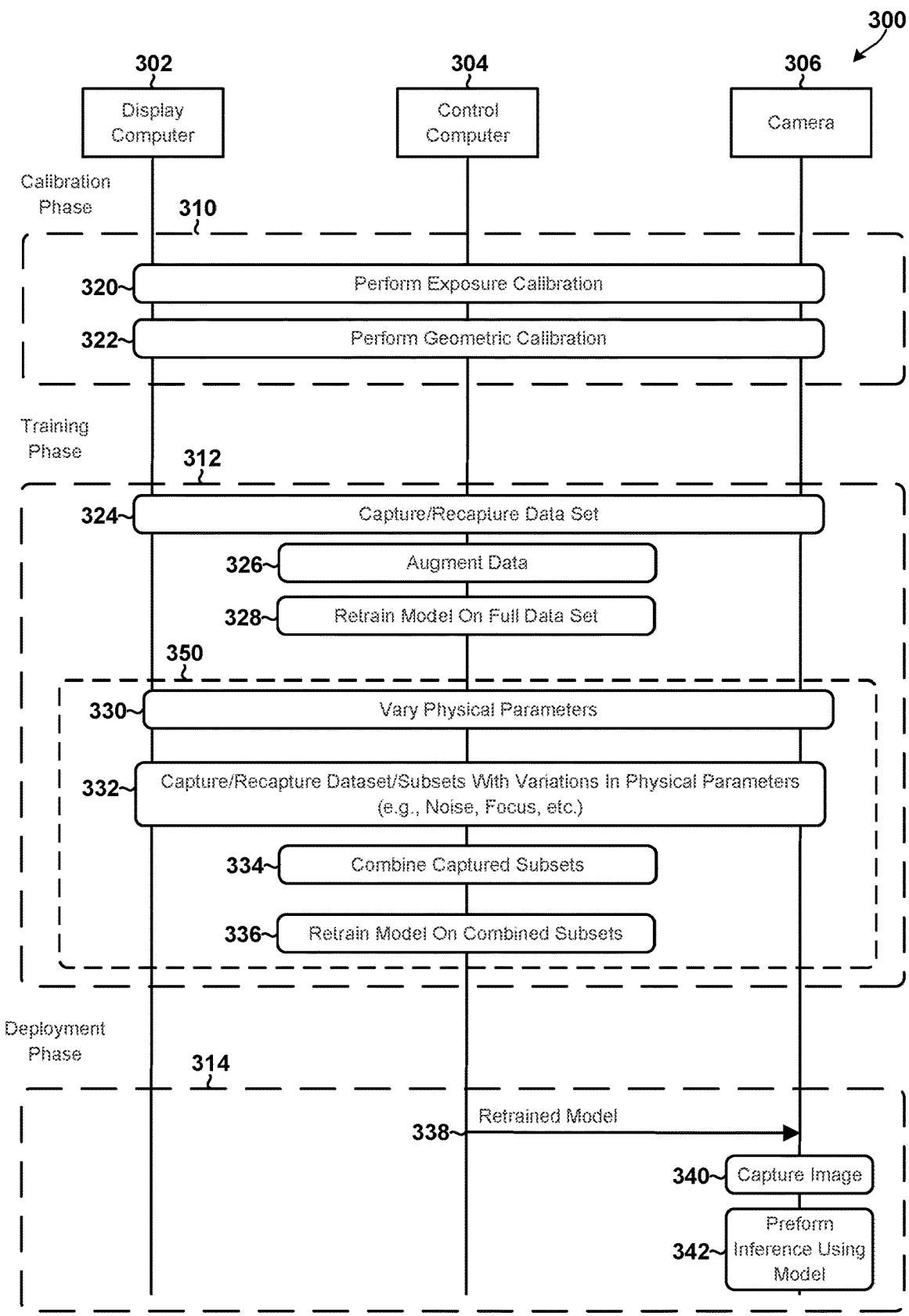
FIG. 3 is an activity diagram illustrating an overview of a method of training a neural network using recaptured images in accordance with various embodiments.

FIG. 3 is an activity diagram illustrating a method 300 of performing inference in accordance with some embodiments. The operations in method 300 may be performed by a display computer 302, control computer 304 and/or a camera 306. In the example illustrated in FIG. 3, method 300 includes three distinct phases: a calibration phase 310, a training phase 312, and a deployment phase 314.

The calibration phase 310 may include the display computer 302, control computer 304 and/or camera 306 performing exposure calibration in operation block 320 and/or geometric calibration in operation block 322.

The training phase 312 may include capturing/recapturing a full dataset in operation block 324, augmenting the dataset (e.g., applying the per-channel gains, adding Gaussian noise directly to the pixel data, etc.) in operation block 326, and training/retraining on the dataset in operation block 328 to create a new or updated model. The method may further include capturing/recapturing subsets of the dataset based upon variations (e.g., in noise, focus, etc.) in operation block 350. In particular, operation block 350 may include varying the physical parameters (and optionally also varying the image signal processing parameters) of the camera 306 in operation block 330, capturing/recapturing subsets of data in block 332, combining the recaptured subsets and optionally the full dataset in operation block 334, and retraining the model with the combined dataset in operation block 336 to create an updated model. Since there could be potentially millions of images, it is important that the system performs the above-described process as fast as possible. It is also important that both the display and the camera are in sync (i.e., that the expected image is displayed correctly and held on the display for the full duration of the camera exposure).

In some embodiments, method 300 may include performing "physical data augmentation" operations (e.g., in operation blocks 330 and/or 350, etc.). This form of data augmentation may be achieved by varying physical parameters, such as scene light level (which affects the image noise level), lens focus distance (which affects the sharpness of the image), etc. during the recapture process. The physical data augmentation operations may be performed in addition to the more traditional data augmentation operations. That is, traditional data augmentation operations are performed during the actual training operations (e.g., in operation block 326, etc.). As such, traditional data augmentation is 'synthetic' (e.g., Gaussian noise is directly added to the pixel data just prior to training, etc.). On the other hand, the physical data augmentation operations may be performed or induced during the image capture process (e.g., in operation block 330 and/or 332, etc.) where they are affected directly by the optics, sensor, etc. One example of such physical data augmentation is noise augmentation, which may include inducing real image/sensor noise during capture as opposed to being added (using some noise model) post-capture at training time (e.g., in operation block 336). For these and other reasons, physical data augmentation may be more realistic than traditional data augmentation.

The deployment phase 314 may include deploying the trained or retrained model to the camera 306 in operation 338, repeatedly capturing images using the camera device in operation block 340, and performing inference using the new model in operation block 342.

The various phases and their operations will be described in further detail below.

In order to recapture images, a high-quality display may be required (e.g., as part of a display computer 302, etc.), both to display the images to be recaptured, and to display images for calibration purposes. The display may be driven by a computer (e.g., a display computer, etc.). The resolution of the display may be chosen such that each pixel in a frame captured by the camera corresponds to at least two pixels on the display, in a given dimension. This may ensure that the individual pixel elements of the display are not resolved by the camera 306, which could lead to aliasing related artifacts or interference patterns. If the model were trained using images that contained frequencies and interference patterns that are not present under normal circumstances, it would be detrimental to the accuracy of inference.

The control computer 304 may be configured to receive captured images from the camera 306 sensor and synchronize the display of images with the capture of images. The control computer 304 may trigger the display of specific calibration images, or frames from the dataset, on the display device or display computer 302. Alternatively, different computers may be used, in which case the control computer 304 and the display computer 302 may be connected so that they may communicate with each other (e.g., using a network, etc.). The display computer 302 may act as a server and/or may display images at the request of the control computer 304.

Figure 4A:
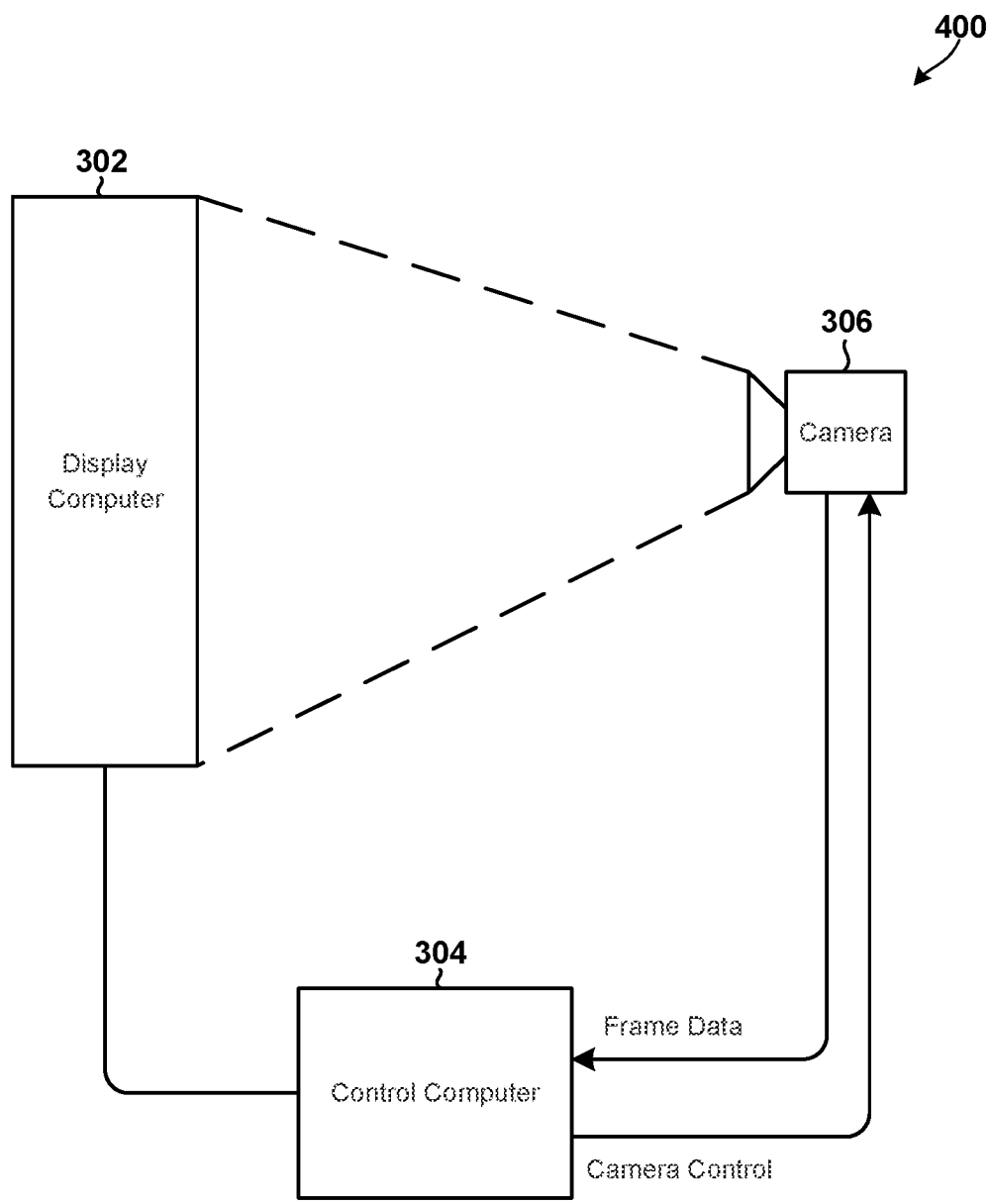
FIGS. 4A through 4C show various architectural configurations for a camera, controlling computer, and display computer that are suitable for use with the various embodiments.
Figure 4B:
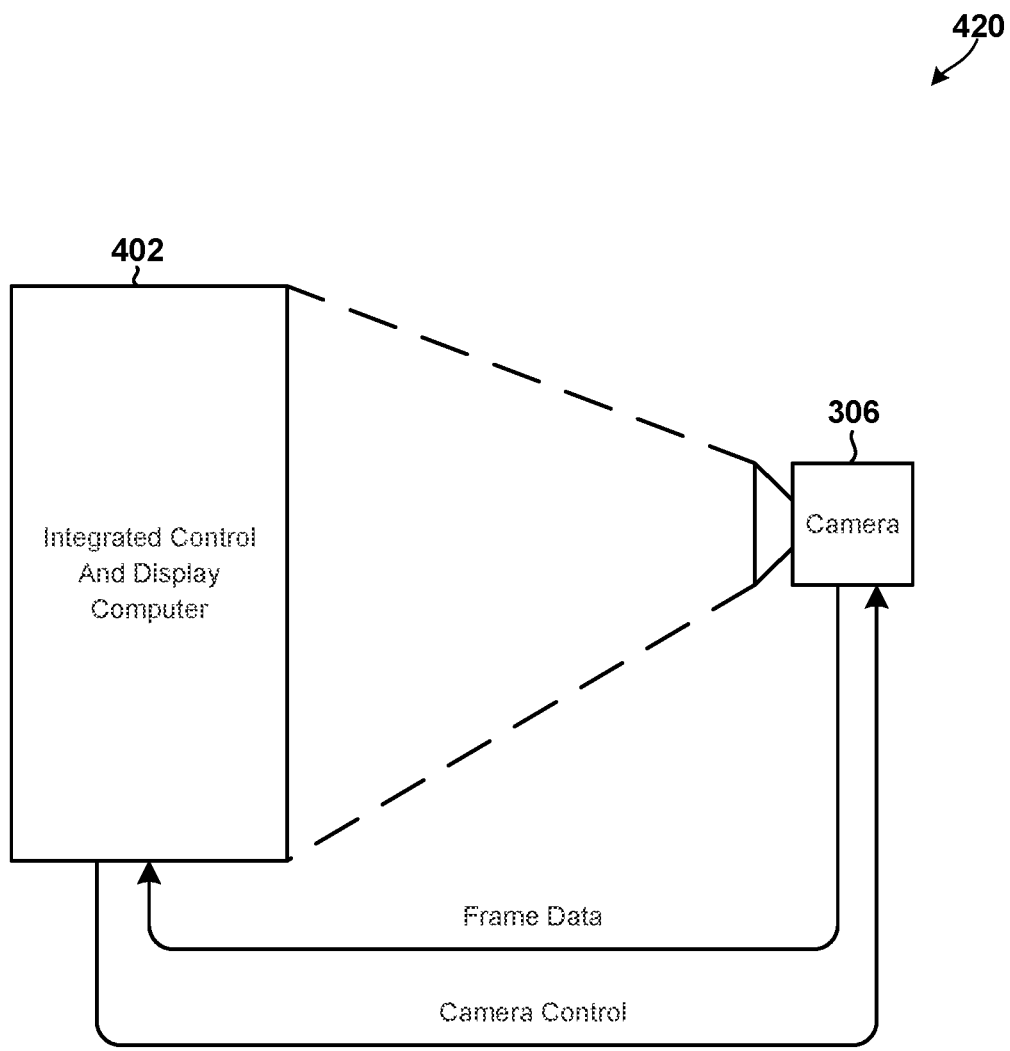
Figure 4C:
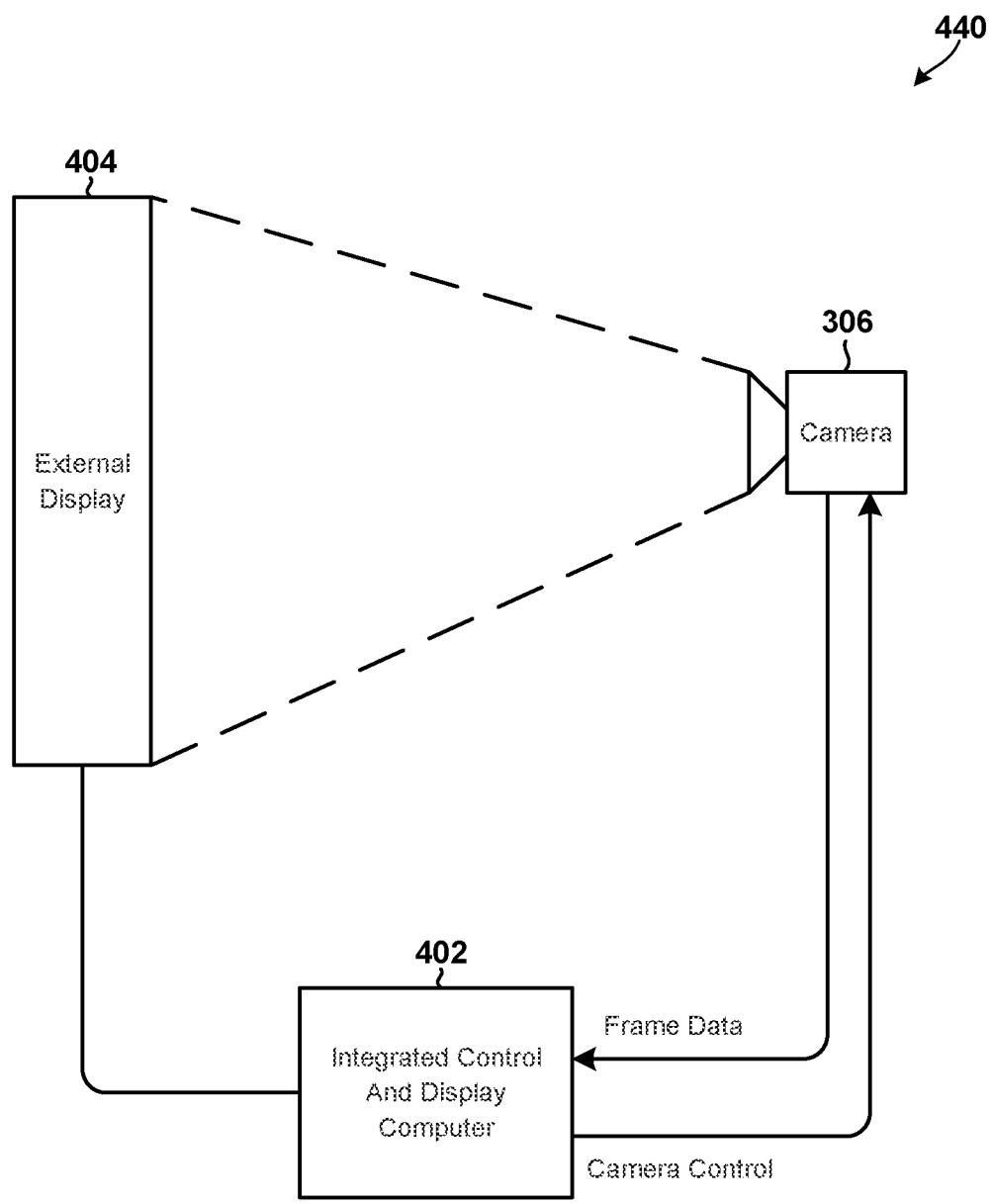

FIGS. 4A through 4C show various architectural configurations for a camera, controlling computer, and display computer that are suitable for use with the various embodiments. FIG. 4A illustrates a system 440 that includes a display computer 302, a control computer 304 and a camera 306, and is similar to the system described above with reference to FIG. 4. FIG. 4B illustrates a system 420 that includes the camera 306 and an integrated control and display computer 402, which may be configured to perform the functions of both the display computer 302 and the control computer 304. FIG. 4C illustrates a system 440 that includes the camera 306, the integrated control and display computer 402, and an external display 404.

As mentioned above, some embodiments may include performing exposure calibration (e.g., in block 320 in FIG. 3, etc.). Generally, recaptured images should fully utilize the dynamic range of the camera. Also, it is very important not to lose information through burnout/overexposure. Therefore, careful calibration of the camera's exposure level may be necessary. Once calibrated, the camera's exposure level and gain may be set manually (i.e., Automatic Exposure (AE) control is disabled) at recapture time. The goal of the exposure calibration operations may be to make the white point of the pixels in the recaptured images match the white point of the dataset.

In some embodiments, exposure calibration (e.g., in block 320 in FIG. 3, etc.) may be accomplished by displaying a completely white image on the display (maximum pixel intensity for all pixels). The camera 306 or exposure calibration algorithm may then capture the image repeatedly, adjusting the exposure and gain manually until the number of pixels that are saturated (at the white level) are within a target range. The target range may be specified as percentages of the pixels in the frame that are to be saturated.

In some embodiments, exposure calibration may be performed in two stages. In the first stage, a very high exposure time and gain may be used initially, which may result in many, if not all, of the captured pixels being saturated. The total sensitivity (i.e., the exposure time multiplied by the gain) may be reduced (for example, by a factor of two), repeating until the number of saturated pixels falls below the minimum threshold. The second stage of calibration may include estimating the adjustment that needs to be made to the total sensitivity that will make the number of saturated pixels fall within the target range. After the adjustment is made, the exposure and gain may be updated, and the frame may be recaptured. These operations may be repeated until the number of saturated pixels in the captured frame has converged to be within the target range and/or until the white point of the pixels in the recaptured images match the white point of the dataset.

Figure 5:
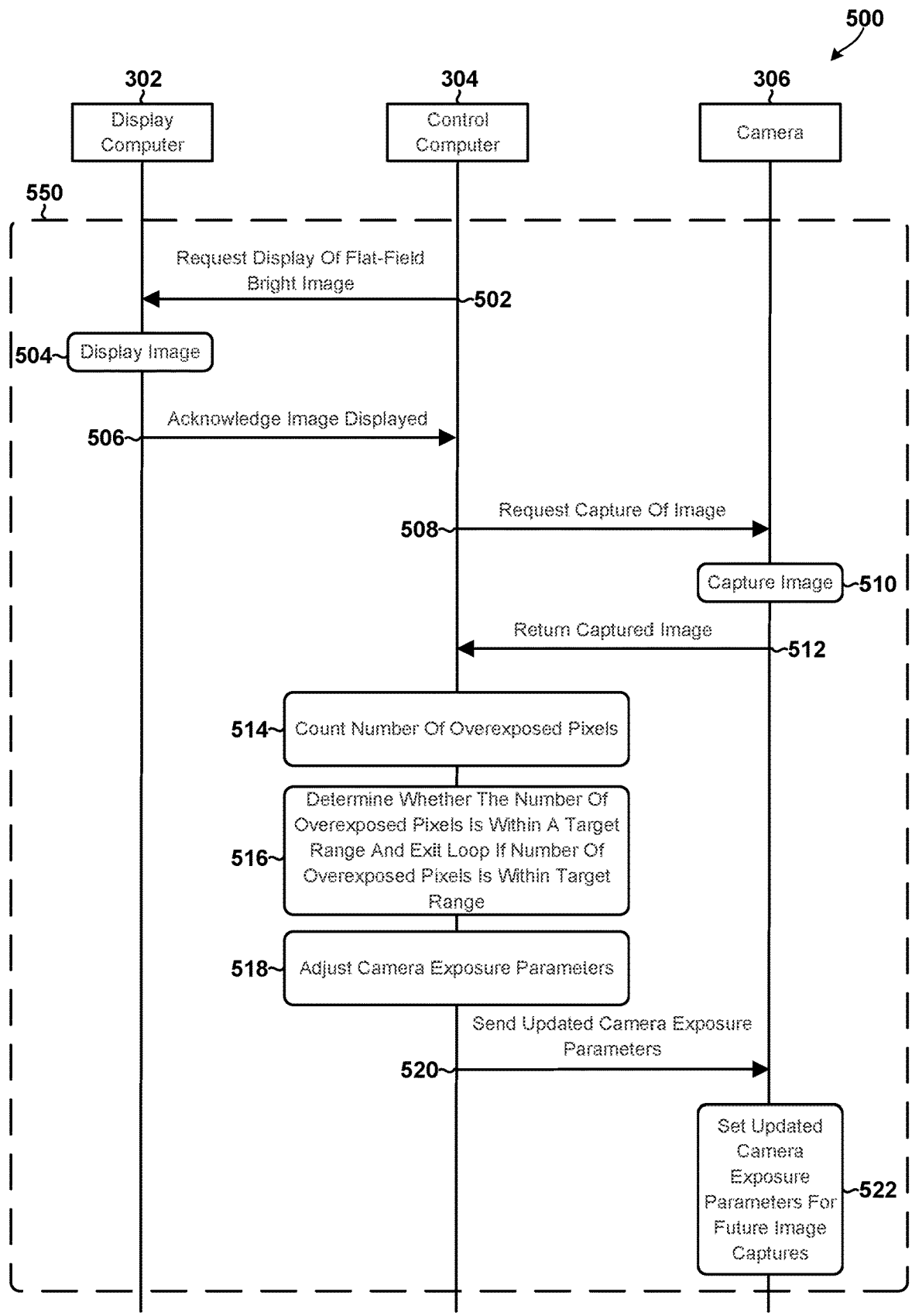
FIG. 5 is an activity diagram illustrating a method of performing exposure calibration in accordance with various embodiments.

FIG. 5 is an activity diagram illustrating a method 500 of performing exposure calibration operations in accordance with various embodiments. In operation 502, the control computer 304 may send a request to the display computer 302 to cause the display computer 302 to display a flat-field bright image. In operation block 504, the display computer 302 may display the requested image on an electronic display. In operation 506, the display computer 302 may acknowledge that the image is displayed. In operation 508, the control computer 304 may request the camera 306 to capture the displayed image. In operation block 510, the camera 306 may capture the displayed images. In operation 512, the camera 306 may return the captured image to the control computer 304.

In block operation 514, the control computer 304 may count the number of overexposed pixels in the captured image. In operation block 516, the control computer 304 may determine whether the number of overexposed pixels is within a target range and stop further processing and/or exit the loop 500 in response to determining that the number of overexposed pixels is within a target range. In response to determining that the number of overexposed pixels is not within the target range, in operation block 518 the control computer 304 may adjust the camera exposure parameters (e.g., by increasing or decreasing them, etc.). In operation 520, the control computer 304 may send the updated exposure parameters to the camera device. In operation block 522, the camera 306 may set its exposure parameters to the received exposure parameters and use these exposure parameters for future image captures.

Operations 502-522 in loop 550 may be performed repeatedly until the control computer 304 determines that the number of overexposed pixels is not within a target range (e.g., in operation block 516).

The various embodiments may perform geometric calibration (e.g., as part of operation 322 in FIG. 3, etc.), which may include applying a geometric mapping to each image before it is displayed during recapture. The mapping may be defined using a display mesh, which may be generated through a calibration process. The mapping may ensure that pixels in the recaptured images are geometrically aligned, with a one-to-one correspondence with pixels from the original dataset. Thus, the captured images may have the same image dimensions as the original dataset images. The geometric calibration process may include generating synthetic images and displaying them on the display computer 302. The images may then be captured with the camera 306 and processed to generate the display mesh.

Figure 6:
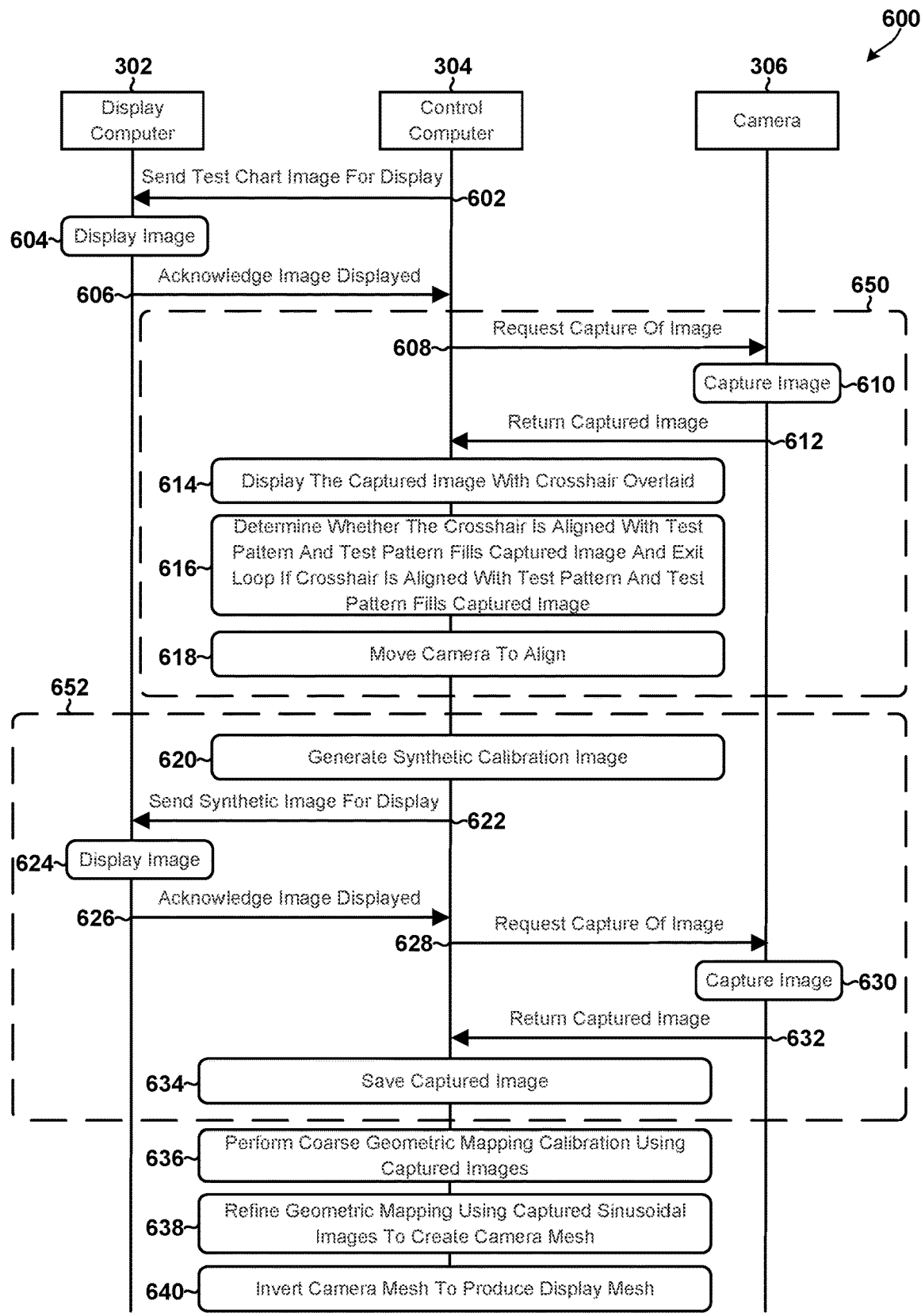
FIG. 6 is an activity diagram illustrating a method of performing geometric calibration in accordance with various embodiments.

FIG. 6 is an activity diagram illustrating a method 600 of performing geometric calibration in accordance with various embodiments. Operations 602-618 may include performing an initial alignment of the display computer 302 and the camera 306. The camera 306 may be positioned and oriented such that its principal axis is orthogonal to the electronic display of the display computer 302 and passes through the center of the electronic display.

In operation 602, the control computer 304 may send a request message to the display computer 302 to cause the display computer 302 to display a test image in its electronic display. In operation block 604, the display computer 302 may display the requested image so that it fills the entire electronic display screen of the display computer 302. In addition, the display computer 302 may display a marker (e.g., a crosshair, etc.) to mark the center of the display image. In operation 606, the display computer 302 may send a message to the control computer 304 to acknowledge that the image is displayed.

In operation 608, the control computer 304 may send a message to the camera 306 to instruct or cause the camera 306 to commence capturing the displayed image. In operation block 610, the camera 306 may capture the displayed image. In operation 612, the camera 306 may send the captured image to the control computer 304.

In operation block 614, a preview application running on the control computer 304 may display a live stream of images returned from the camera 306. Additionally, the preview application may draw a marker over the center of each image prior to displaying it. In operation block 616, the control computer 304 may determine whether the crosshair is aligned with the test pattern, and whether the test pattern fills the captured image. The control computer 304 may stop further processing and/or exit the loop 600 in response to determining that the crosshair is aligned with the test pattern and that the test pattern fills captured image. In operation block 618, the control computer 304 may instruct an operator to move the camera 306 or otherwise cause the camera 306 to move so that the center of the display is aligned with the center of the captured frames and/or so that the marker present in the captured image is aligned with the marker drawn over it.

The purpose of the preview application (e.g., in operation block 614) is to position and orient the camera 306 such that the center of the display is aligned with the center of the captured frames (e.g., in operation block 618), by aligning the marker present in the captured image with the marker drawn over it. Further, an operator may ensure that no part of the captured field of view is outside of the active display area. The operator may set the distance between the camera and the display to capture as many of the display's pixels as possible, without capturing anything beyond the edges of the active display.

Operations 608-618 in loop 650 may be performed repeatedly until the system or an operator determines that the crosshair is aligned with the test image, and that the test image fills the captured image.

In some embodiments, operations 614-618 could be performed by the control computer 304 that is capable of adjusting a testbed upon which either the display computer or the camera device is mounted (i.e., the controlling computer may move the display computer or the camera device autonomously) based upon the results of the control computer 304 comparing the images. Said another way, in various embodiments, the display computer may be moved as well as, or instead of, the camera device.

In operation block 620, the control computer 304 may generate a synthetic calibration image. In operation 622, the control computer 304 may send a request to the display computer 302 to cause the display computer 302 to display the synthetic calibration image. In operation block 624, the display computer 302 may display the requested image. In operation 626, the display computer 302 may send an acknowledge message to the control computer 304 to acknowledge that the image is displayed. In operation 628, the control computer 304 may send a request message to the camera 306 to cause the camera 306 to capture the displayed image. In operation block 630, the camera 306 may capture the displayed image. In operation 632, the camera 306 may send the captured image to the control computer 304. In operation block 634, the control computer 304 may save the captured image in memory.

In an embodiment, operations 620-634 in loop 652 may be automated, and they may be repeated multiple times. The control computer 304 may iterate through sequences of synthesized images, and using the camera 306, capture an image of each displayed image. To reduce any impact of noise on the calibration, in some embodiments the control computer 304 may capture each image multiple times, and these images may then be averaged together in order to get a captured image with a much higher signal to noise ratio.

In operation block 636, the control computer 304 may perform coarse geometric mapping calibration using captured images (e.g., binary coded images, etc.). In an embodiment, the approximate y coordinates may be recovered by "clocking out" the binary representation of the bits of the displayed y coordinates through the display. One frame may be displayed for each bit position of the y coordinate (i.e., the number of frames displayed is equal to the number of digits in the binary representation of the y coordinate). For example, if the maximum display y coordinate is 2159 (1000,0110,1111 in binary), then 12 frames would need to be displayed. For pixels whose y coordinates have a 1 at the current bit position, the pixels may be set to white. Otherwise, the pixels may be set to black. In practice, since only approximate coordinates may be recovered through this method, some of the least significant bits are omitted. In some embodiments, the three (3) least significant bit positions may be omitted in order to obtain pixel locations accurate to eight pixels.

In an embodiment, the display coordinates may be recovered from the captured images by comparing each pixel of each frame against a threshold. Pixels whose intensities are below the threshold may signify a 0 bit, and pixels whose intensities are at or above the threshold may signify a 1.

The approximate display x coordinates may be recovered using a similar procedure whereby for each pixel in a captured image, the approximate coordinates with respect to the display of the displayed pixels that contributed to the captured pixel's value are known.

Figure 7:
FIG. 7 is an illustration of an exemplary image captured by an embodiment that encodes a specific bit of each pixel's display x coordinate.

FIG. 7 is an illustration of an exemplary image (from a sequence of images) captured by an embodiment that encodes a specific bit of each pixel's display x coordinate. Note the effect of camera lens distortion (e.g., the vertical line 702 is curved, etc.). The geometric mapping calibration captures and corrects for this lens distortion.

Returning to FIG. 6, in operation block 638, the control computer 304 may refine the geometric mapping using the captured sinusoidal images in order to create a camera mesh. The camera mesh may have the same resolution as a frame captured by the camera 306. For each pixel location in the captured frame, the camera mesh gives the pixel location, in display coordinates, that corresponds to the captured pixel location. In other words, the camera mesh maps camera pixel coordinates to display pixel coordinates. The camera mesh may include a two-dimensional array of (x,y) pixel coordinates, and the coordinates may have sub-pixel precision.

Figure 8:
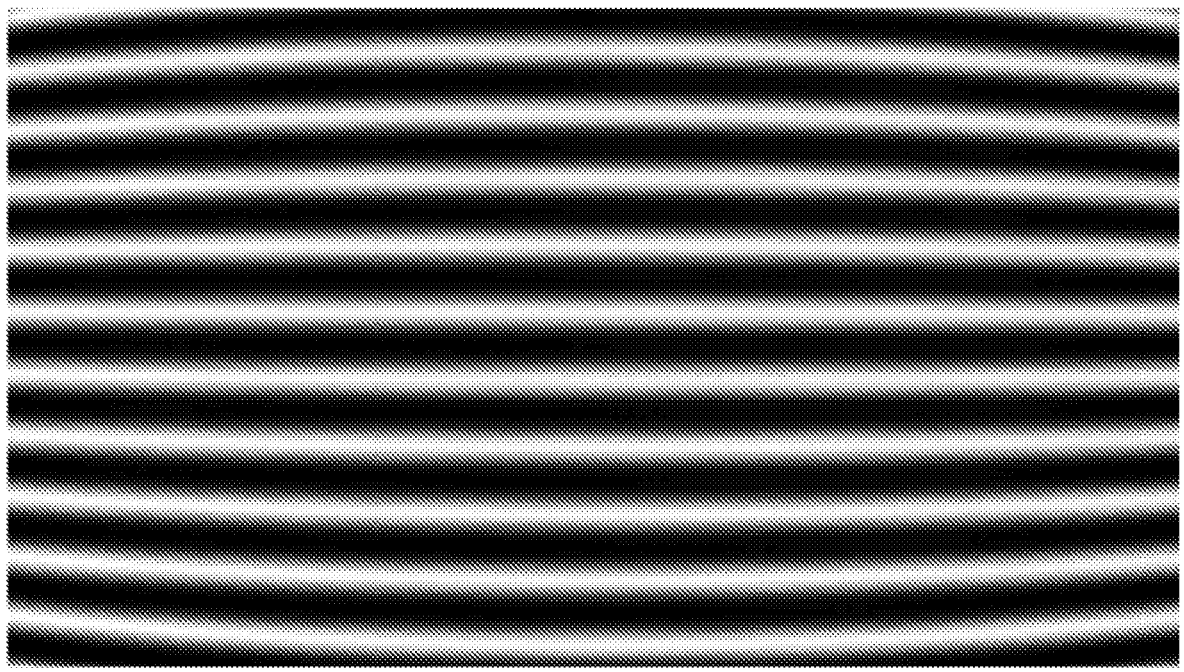
FIG. 8 is an illustration of an exemplary image captured by an embodiment for y coordinate refinement.

The display coordinates recovered in operation block 636 may be very approximate, since the camera is expected to have a lower resolution than the display. Thus, a refinement process may be necessary. In an embodiment, the refinement process may involve displaying and capturing sinusoidal patterns at different phase offsets, and subsequently using them to refine the display pixel coordinates with subpixel accuracy. For refinement of the Y coordinate, horizontal bands may be displayed where the pixel intensity varies according to the sine of the pixel's y coordinate. FIG. 8 illustrates an exemplary image captured by an embodiment for y coordinate refinement.

Four versions of the image are displayed and captured, with starting phases of 0, $\pi/2$, $\pi$, and $3\pi/2$. In effect, the four images encode sin(y), cos(y), −sin(y) and −cos(y), respectively. From the captured versions of these images, a phase angle for each pixel may be recovered. Subtracting the first image from the third images gives 2*sin(theta), and subtracting the second image from the fourth image gives 2*cos(theta). The phase angle (theta), may be recovered with the following formula: theta=arctan((image1−image3)/(image2−image4)).

The initial approximations recovered in operation block 636 may have sufficient accuracy to recover the period. By combining the recovered period with the recovered phase angle, it is possible to obtain sub-pixel accurate estimates of the display y coordinates. The x coordinates may be refined in a similar manner.

The above operations describe how to generate a camera mesh that maps camera pixel coordinates back to display pixel coordinates. In some embodiments, a mesh that maps display pixel coordinates to camera pixel coordinates may be required. As such, in operation block 640, the control computer 304 may invert the camera mesh to produce a display mesh that maps display pixel coordinates to camera pixel coordinates.

Figure 9:
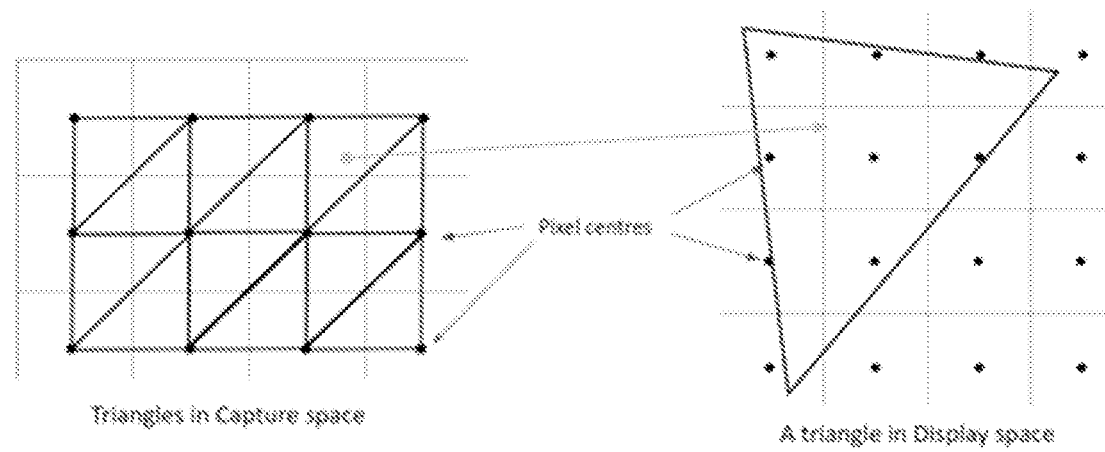
FIG. 9 is a block diagram that illustrates a method for generating a display mesh using triangle rasterization in accordance with various embodiments.

FIG. 9 illustrates a method for generating a display mesh using triangle rasterization in accordance with various embodiments. The method rasterizes roughly twice as many triangles as there are pixels in the captured image. The triangles are rasterized in display coordinate space, which is expected to have a higher resolution than camera coordinate space. The vertices (x,y) of the triangles come from the camera mesh. Camera coordinates at each vertex are given by the raster coordinates of the center of each pixel in capture space, and these camera coordinates are interpolated across the face of each triangle, in order to obtain a camera coordinate at each display position. The resulting mesh has the same dimensions as the display, but it consists of camera pixel coordinates. It may be used to distort the images coming from the dataset prior to display, so that recaptured images will correspond pixel-for-pixel with the original dataset images, free of distortion or translations due to camera intrinsic parameters such as lens distortion, or extrinsic factors such as the relative placement of the camera with respect to the display.

Figure 10:
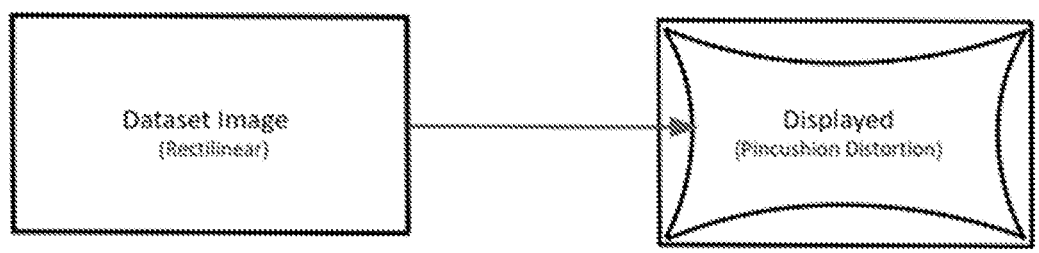
FIG. 10 is a block diagram that illustrates the functions of a camera coordinate mesh in accordance with an embodiment involving a lens that introduces barrel distortion.

FIG. 10 illustrates how the camera coordinate mesh works in accordance with an embodiment involving a lens that introduces barrel distortion. When this image is captured, barrel distortion introduced by the lens will result in a rectilinear image being captured. The display coordinate mesh is a calibrated mapping that incorporates the barrel distortion effect into its mapping. The camera coordinate mesh applies the inverse of this mapping, and therefore it would introduce pincushion distortion. By applying pincushion distortion to the image before it is displayed, the barrel distortion effect of the lens is effectively cancelled out.

The various embodiments may enable a dataset to be recaptured (e.g., as part of the training phase 312 in FIG. 3, etc.). A dataset may be recaptured by displaying each frame of the dataset (including the images used for training, as well as those used for validation) in sequence, then capturing each image using the camera device. Since there could be potentially millions of images, this process should be as fast as possible. However, it is important that both the display and the camera are in sync (i.e., that the expected image is displayed correctly and held on the display for the full duration of the camera exposure).

Figure 11:
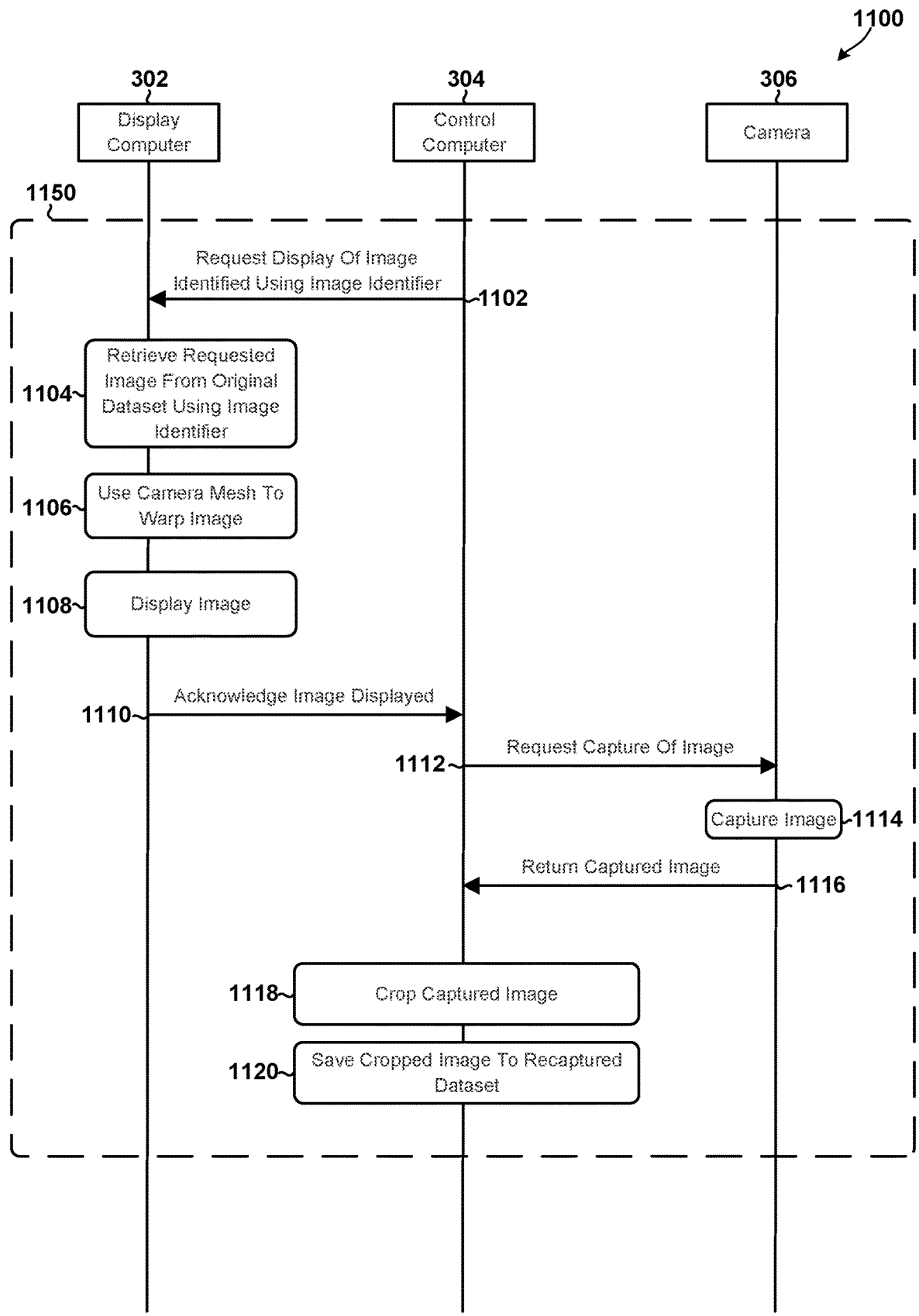
FIG. 11 is an activity diagram illustrating a method of recapturing a dataset using centralized synchronization in accordance with the various embodiments.
Figure 12:
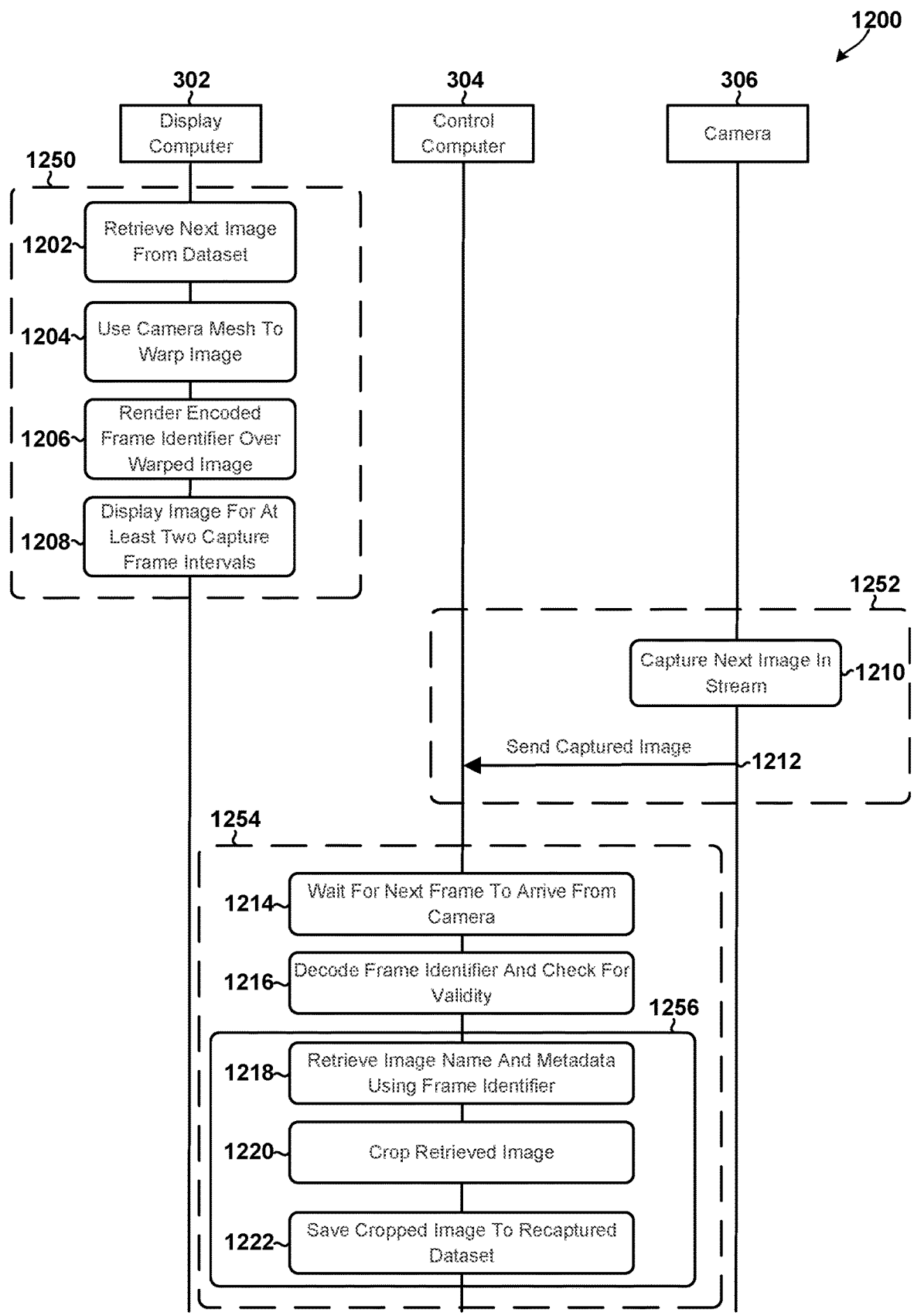
FIG. 12 is an activity diagram illustrating a method of recapturing a dataset using synchronization through frame identifiers in accordance with the various embodiments.

FIGS. 11 and 12 are activity diagrams illustrating methods 1100, 1200 of recapturing a dataset using synchronization (e.g., as part of operation 324 in FIG. 3, etc.). In particular, FIG. 11 illustrates a method 1100 of recapturing a dataset using centralized synchronization, and FIG. 12 illustrates a method 1200 of recapturing a dataset using synchronization through frame identifiers.

With reference to FIG. 11, in method 1100, the control computer 304 may manage all synchronization. If the display is integrated into the control computer 304, or driven directly by the control computer 304, the control computer 304 may prepare the next image from the dataset by retrieving it from storage and transforming it using the camera coordinate mesh and displaying it such that it is centered on the display. It then captures an image of the display using the camera 306. This may be done synchronously, by sending a capture request to the camera 306 after the image has been displayed. Alternatively, if the camera 306 is operating in a streaming mode (e.g., sending a stream of consecutive frames to the control computer 304, etc.) timestamps may be used to pick the first frame that arrives at the control computer 304 where the exposure commenced after the image appeared on the display.

If the display is driven by a separate computer, then in operation 1102 the control computer 304 may send an image display request to the display computer 302. In this case, the dataset images may be stored on the display computer 302 (e.g., in memory for improved performance, in local storage, in a network location, etc.), and the control computer 304 may send an image identifier (e.g., a frame identifier, a relative or absolute path identifying the image to be displayed, etc.) to the display computer 302. In operation block 1104, the display computer 302 may retrieve the requested image from storage using the image identifier. In operation block 1106, the display computer 302 may transform the retrieved image using the camera coordinate mesh. In operation block 1108, the display computer 302 may display the requested image such that it is centered on the display. In operation 1110, the display computer 302 may send an acknowledge message to the control computer 304 to acknowledge that the image is displayed. In operation 1112, the control computer 304 may request the camera 306 to capture the displayed image. In operation block 1114, the camera 306 may capture the displayed images. In operation 1116, the camera 306 may send the captured images to the control computer 304. In operation block 1118, the control computer 304 may crop the captured image. In operation block 1120, the control computer 304 may save the cropped image to the recaptured dataset. Operations 1102-1120 in loop 1150 may be performed repeatedly for each image in the dataset.

In an enhanced embodiment, pipelining may be used to maximize the rate at which dataset images may be recaptured. Pipelining involves preparing multiple images in advance, loading them from storage, transforming them using the camera coordinate mesh, and converting them into a frame buffer format that is compatible with the API used to display images on the screen. Multithreading may be used to allow multiple processing cores to prepare images in parallel. The display-ready images may be buffered to improve performance. After a frame has been captured, the next dataset image to be displayed is retrieved from the buffer, by a thread running in parallel with the image preparation threads, and it is displayed on the screen. This pipelining method reduces the delay between capturing a frame, and displaying the next dataset image to be captured.

In some case, the synchronization method described in operations 1102-1120 of FIG. 11 may not be optimal in terms of the rate at which dataset images may be recaptured. There are many potential delays. For example, after an image is sent to the display subsystem to be displayed, time elapses before the hardware retrieves the new image from memory and updates the pixels on the physical display. The control computer 304 may be required to ensure that the transition from displaying the previously displayed image to displaying the currently requested one was fully completed before an image of the display is captured by the camera 306. It may then be required to wait until a frame has been captured, where the exposure of the frame commenced after the image was stably shown on the display computer 302 or display device. Only then may it initiate the displaying of the subsequent dataset image.

In an enhanced embodiment, many of the delays in the recapture process may be eliminated by embedding frame identifiers in the displayed images. Frame identifiers (IDs) may identify which image from the dataset is currently being displayed by the display computer 302. For example, the frame identifier could be an integer that indexes a particular image in the dataset.

In an embodiment, a frame identifier may be embedded into the displayed image by rendering a binary representation of the frame identifier into the image prior to display using dark and bright patches to denote zero and one bits. The frame identifier may be rendered to a known area of the frame (i.e., a pre-determined location), such that it may be decoded after the frame has been recaptured. For robustness, frame identifiers may include check bits that could encode a checksum. One checksumming method could involve summing all of the bits in the frame identifier that are set to 1, and appending the binary representation of this integer sum to the string of bits to be encoded in the image using patches. Further, the negation of the sum value could be used instead. This may ensure that there is always a sufficient mix of dark and bright patches in the embedded frame identifier. This is useful for measuring the contrast between dark and bright patches. The contrast metric may also be useful for detecting partial frames (as described in more details below).

The frame identifiers could be rendered such that they appear at the edges or corners of the recaptured image. This allows them to be easily cropped out. It is important that the frame identifiers be cropped out of the recaptured image prior to training to ensure that the model does not infer any knowledge about the image, or any association between images, from the frame identifiers. The camera mesh may be used to render the patches at locations in the displayed frame, such that they will appear at the desired locations in the captured frame.

In an embodiment, the control computer 304 may be configured to decode frame identifiers and check their validity after the image is recaptured. Each patch may be compared against a threshold to determine whether it is dark or bright. Due to the lens shading or vignetting effect, a single threshold may not be ideal for all spatial locations in the frame. Therefore, a calibration step may be performed. This calibration may be performed at the same time as exposure calibration (e.g., operations 502-522 in FIG. 5, etc.). During threshold calibration, the display may be filled with a completely black image and the displayed image may be captured. Then the pixel values within each of the patch areas in the captured frame may be averaged. For each patch, this gives an intensity level corresponding to dark patches. This may be repeated, with the display filled with pixels at maximum intensity, giving the per-patch intensity level corresponding to bright pixels. For each patch, the average of the dark and bright intensity levels may yield a suitable threshold for determining whether that patch is dark or bright.

At recapture time, a bit string may be recovered from the patch values in the captured image by comparing the average values of each patch against the calibrated threshold. This bit string may be decoded, recovering the check bits and the frame identifier. The check bits may also be validated to ensure that the recovered frame identifier is correct.

In an embodiment, the frame capture rate may be maximized in order to ensure robustness. This may be necessary because when a new frame is released for display onto the display device, the transition from the previous frame to the new frame does not occur instantaneously. There is usually a transition period where both the previous frame and the current frame make a contribution to some or all of the pixels on the display. If the display is in transition during the exposure of the frame on the camera side, then an invalid or corrupted frame may be captured.

In order to prevent this from occurring, frames are not released to the display at a rate that is more than half of the frame capture rate. This means that at least two frames are captured by the camera, per image displayed. This ensures that while the exposure of a frame may overlap with a frame transition, the exposure of two consecutive captures cannot overlap. Two instances of the frame identifier may be embed in each image. One instance should be positioned near the top of the displayed frame, and the other instances should be positioned near the bottom of the displayed frame. If the frame identifiers (and their checksums) in the captured frame do not match, it is assumed that the frame is corrupted and it is discarded. The next frame captured will be valid, and it will have matching and valid frame identifiers.

It is possible that two consecutive images of the same displayed frame with valid and matching frame identifiers are captured. In this case, the best of the two frames may be chosen (e.g., using a contrast metric, etc.). By averaging the dark patches, averaging the bright patches, and comparing the difference between the two, it is possible to determine a measure of contrast between the dark and bright patches of the embedded frame identifier. The image that yields the highest contrast may be selected as the best image, and the least likely to have been damaged or corrupted in any way.

Using frame identifiers, it is possible to recapture a dataset at a rate of up to half of the camera frame rate (e.g., if the camera frame rate is 30 frames per second, then the maximum capture rate is 15 frames per second, etc.). This makes it feasible to recapture even very large datasets (e.g., the ImageNet dataset that comprises approximately 1.3 million images could be recaptured in approximately 24 hours, etc.).

With reference to FIG. 12, in operation block 1202, the display computer 302 may retrieve the next image for displaying from the dataset. In operation block 1204, the display computer 302 may transform the retrieved image using the camera coordinate mesh. In operation block 1206, the display computer 302 may render the encoded frame identifier over the warped image. In operation block 1208, the display computer 302 may display the image for at least two capture frame intervals. Operations 1202-1208 in loop 1250 may be performed repeatedly for each image in the dataset.

In operation block 1210, the camera 306 may capture the next image in the stream. In operation 1212, the camera 306 may send the captured image to the control computer 304. Operations 1210-1212 in loop 1252 may be performed repeatedly until a user stops the camera 306.

In operation block 1214, the control computer 304 may wait for next frame to arrive from the camera 306. In operation block 1216, the control computer 304 may decode the frame identifier and check its validity. The control computer 304 may perform the operations in loop 1256 in response to determining that the decoded frame identifier is valid. For example, in operation block 1218, the control computer 304 may retrieve the image name and metadata using the frame identifier. In operation block 1220, the control computer 304 may crop the retrieved image. In operation 1222, the control computer 304 may save the cropped image to the recaptured dataset. Operations 1214-1222 in loop 1254 may be performed repeatedly until a user stops the control computer 304.

In an embodiment, the three operations groups 1202-1208, 1210-1212, and 1214-1222 may all operate as three separate threads or processes running in parallel on the display computer 302, control computer 304, and camera 306 respectively because there is no explicit synchronization between them. This may improve the performance of an embodiment, because the display computer 302 operates at half (or less) of the capture device's capture framerate, so that the capture device is guaranteed to be able to keep up with the display computer 302. The control computer 304 needs to be able to process the captured frames as quickly as the capture device captures them and sends them to the control computer 304. After the entire dataset has been displayed by the display computer 302, the user may explicitly stop the capture device and the control computer 304.

There are many attributes of images presented to a convolutional neural network that may affect inference accuracy, such as the level of noise present, color contrast, color accuracy, sharpness level, focus accuracy, and overall brightness. In a widely available dataset such as ImageNet, a wide distribution may occur for each of these attributes. For example, varying levels of sharpness may occur throughout the dataset, since the images would have been taken with a wide variety of cameras, with a wide variety of lenses, image processors, and image quality settings.

In general, with respect to the images coming from a camera 306 on which inference is to be performed, the more a given attribute is within the distribution of the training set, the better the inference accuracy. Data augmentation is a widely used method that makes the model generalize better, by broadening the distributions at training time. For example, if the images seen by the model at training time have a wider distribution of noise levels, the network will generalize better with respect to the presence of noise in the images, and it will perform better on average across the wide range of lighting conditions across which the camera may be expected to operate.

Training on a recaptured dataset not only gives the ability to train on images that are in a non-standard format or colorspace, such as the raw images that are produced by a typical camera, but it also ensures that the distribution of the training dataset is closer to the distribution of the images coming from the camera 306 that will be encountered by the network at inference time, since the same type of lens and camera sensor are used in both cases.

Further, the recapture methods described herein provide tools that allow the network to be trained to generalize better, to perform well over a range of lighting conditions (e.g., scene illumination, color temperature of the illuminant, scene dynamic range, etc.). Using data augmentation, in conjunction with recapture, the recapture methods can make the model's accuracy invariant to many of the attributes of the images coming from the camera. It may even be possible to train a model that can perform well across a range of cameras, where the optics and/or sensor may be different. The various methods described herein may be used for training a model to be invariant to various image attributes, in addition to providing various additional benefits.

The various embodiments may enable the model to be trained so that it is noise level invariant. When a dataset is recaptured, the ideal total sensitivity is usually obtained through the calibration steps described previously (e.g., with reference to FIG. 5 and FIG. 6, etc.). The total sensitivity may be defined as T·G, where T is the exposure time, and G is the sensor gain. The gain may be adjusted, and the exposure may be adjusted by the inverse amount, in order to maintain the same total sensitivity. Thus, images with differing gains may be captured correctly by adjusting the exposure applied. As the gain is increased, and the exposure time reduced accordingly, more noise will be present in the captured images.

If the model were to be trained using only images captured at a single gain, then the network would give good accuracy at inference time as long as the camera was always programmed with the same gain at inference time. However, as lighting conditions change at inference time, it may be necessary to change the camera gain, which would vary the noise level in the images, and result in a decrease in accuracy. By training the model using images captured with varying gains, the various embodiments may train the model to be noise level invariant, such that it may achieve good accuracy across a range of sensor gains, thereby minimizing any degradation in accuracy as the scene illumination level changes.

One approach to obtaining images with differing noise levels for training is to capture subsets of the dataset at different sensor gains. A second approach is to recapture the entire dataset multiple times at different sensor gains. A third approach is based on the observation that it is not necessary to retrain the entire network to achieve noise invariance. Only some of the earlier layers in the network need to be retrained. In fact, it is usually sufficient to only retrain the first convolutional layer of the network to achieve noise invariance. When only retraining the earlier layers, there is no attempt to train or retrain the network to perform its core task (e.g., classification or object detection, etc.). Therefore, the entire dataset does not need to be used to retrain the first layer. Hence, after the model has undergone full training on a full recaptured dataset, recaptured with some nominal sensor gain, the first layer is retrained using small subsets of the dataset, recaptured with different sensor gains. All layers of the network, with the exception of one or more of the earlier layers, are frozen while retraining with the reduced dataset.

In addition to noise, images captured by camera sensors may suffer from other artifacts, such as GrGb imbalance, defective pixels, and chromatic aberration.

GrGb Imbalance occurs with a Bayer CFA, where green pixels on blue lines may have a different response compared to green pixels red lines. This asymmetry in response may not be uniform across the area of the sensor. This can result in artifacts, adding textures to the image that should not be present.

Defective pixels are pixels that either do not respond to incident light as they should (known as cold pixels), or that accumulate a charge at a faster rate than they should (known as hot pixels) (e.g., due to current leakage, etc.).

Chromatic aberrations are color fringing artifacts that are usually optical in origin. Lateral chromatic aberration is due to the fact that different wavelengths of light are refracted to a different degree. This results in the red, green and blue components of the image not aligning. Longitudinal chromatic aberration is due to different wavelengths of light each having a different point spread function (PSF), since the focal plane for different wavelengths is slightly different. This type of chromatic aberration is notoriously difficult to correct.

These types of artifacts must be corrected by image signal processors in images that are meant for visual consumption because they tend to be distracting and visually objectionable. They may also degrade inference accuracy if the dataset on which the model was trained does not contain such artefacts. However, with the embodiments presented herein, if the camera exhibits any of these artifacts, they will be present in the images used for training, and thus the network will learn to be invariant to the presence of the artifacts.

High dynamic range (HDR) imaging involves photographing a scene that has a high dynamic range, and rendering it such that it produces a realistic image on a display device. Dynamic range, from the camera's point of view, may be understood as the ratio between the radiance from the brightest and darkest areas of the scene, whereas the dynamic range of a display may be understood as the ratio between the luminance of the brightest possible and darkest possible pixels. Even modern displays such as TVs and computer monitors which are marketed as "HDR" have dramatically less dynamic range compared to the dynamic range of real-world scenes.

High dynamic range imaging in the context of an image signal processing traditionally consists of two steps. The first step is to capture and construct a high dynamic range image that covers as much of the scene's dynamic range as possible. Dark areas of the scene need a long exposure time so that they have a sufficient Signal to Noise Ratio (SNR) to make the objects discernable, while bright areas require a shorter exposure time to ensure that content is not burnt out/saturated. The second step is to reduce the dynamic range of the resulting high dynamic range image, in order to produce an image that may be shown on a display device. The techniques used to accomplish the second step are normally referred to as tone mapping.

In the context of inference using convolutional neural networks, high dynamic range imaging has many applications. For example, in the case of a security camera, it may be necessary to simultaneously identify individuals in both darkly and brightly lit areas within the camera's field of view. The camera might have a window to the outdoors in its field of view, where car license plates and individuals approaching the store need to be identified, while at the same time, individuals inside the store need to be monitored and potentially identified. The ability to locate and/or classify objects within such a high dynamic range scene is made possible using a combination of high dynamic range imaging and a convolutional neural network.

Many ISPs on the market have high dynamic range imaging capabilities. They are capable of processing multiple exposures of a scene, captured using different exposure times, to produce high dynamic range images or video frames. The ISP fuses the multiple exposure to produce a high dynamic range image, which is then tone mapped, such that it may be shown on a standard display, or encoded for streaming across a network or for storage for subsequent viewing.

Further, there is an abundance of imaging sensors on the market that have enhanced capabilities to facilitate or enhance the generation of high dynamic range images. Before the advent of sensors with special high dynamic range capabilities, it was necessary to capture multiple exposures of a scene sequentially, with different exposure times, in order to get a set of exposures suitable for producing one high dynamic range image. The downside of this approach is that artifacts due to object motion can result.

Some sensors allow the production of a high dynamic range image from a single exposure, using techniques known as Spatially Varying Exposure (SVE). For example, alternate rows, or alternate pairs of rows, of the image could be captured with a longer exposure time, relative to the remaining rows. Reconstructing a complete, high quality image from such camera output is very challenging however. This approach can mitigate artifacts due to motion, and it can potentially reduce cost, complexity, and memory requirements by reducing the bandwidth needed to transfer image data from the sensor to the ISP. However, it generally compromises the image quality.

Another common approach taken by sensor vendors is known as "staggered HDR". This approach aims to improve over the original sequential multi-exposure approach by mitigating artifacts due to motion. Exposures are still captured sequentially. However, the delay between subsequent exposures is reduced by allowing the readout of data from multiple exposures to occur in parallel. This scheme avoids the need to wait for a full frame at one exposure time to be captured, before starting integration and readout of the subsequent exposure.

Another approach, known as "Dual Conversion Gain (DCG)" can eliminate artifacts due to motion completely. This is accomplished by only exposing the frame once, but by sampling the charge that was accumulated by the pixels multiple times, applying different conversion gains.

The traditional approach to performing inference on high dynamic range scenes is to perform high dynamic range processing on a HDR-capable ISP, and feed the tone-mapped output into the convolutional neural network. In addition to having the same downsides that apply to performing inference on non-HDR images coming from an ISP, accuracy is further reduced by this approach due to the tone mapping algorithm. Tone mapping algorithms need to be locally adaptive, so that they can make both dark and bright scene content clearly visible. To do this, dark areas must be brightened, and bright areas must be darkened. This requires complex filters that operate over large regions of the image. It is very challenging to accomplish tone mapping in a way that does not lead to objectionable artifacts, such as haloes, and an uneven appearance in terms of noisiness and sharpness. These transformations dramatically alter the distribution of the pixels in the image. Thus one could expect to see a very significant drop in accuracy if the network was trained on a dataset with a different distribution, such as a non-HDR dataset. As with other ISP algorithms, a tone mapping algorithm that yields visibly acceptable results is not necessarily optimal in terms of inference accuracy, and in fact this tends to be true to a much greater extent compared to other image signal processing algorithms, due to the more dramatic shifts in distribution.

The various methods presented herein to high dynamic range inference may be used in conjunction with traditional multi-exposure HDR, Staggered HDR, and DCG HDR, making them compatible with a wide variety of imaging sensors. While the traditional approach to high dynamic range imaging consists of two steps (exposure fusion and tone mapping), the methods presented herein may omit the second step. Tone mapping is essential for reducing the dynamic range of the image such that it may be shown on a standard display. However, it is not necessary if it is possible to reconstruct a HDR image of the scene, and send this image directly as input to the network. It is possible to do this if the network can accept tensors in a numeric format with a sufficiently large dynamic range to cover the dynamic range of the scene (such as 16 or 32-bit floating point). Often, lower-precision numeric formats, such as 8-bit, are used for tensors in a network, to increase throughput and/or reduce memory requirements. It is still possible to apply this optimization with this approach, since only one or more of the earlier layers (the input layer in particular) need to accept a higher-precision numeric format.

The various embodiments may merge/fuse the exposures coming from the camera into a single high dynamic range image using traditional approaches. This involves scaling the shorter exposures by an exposure ratio, so that the brightness of an object in the longer exposures matches the brightness of the same object in the shorter exposures. The exposure ratio is the ratio between the exposure time of two exposures. To generate high dynamic range images, it is common to have two or three exposures, where a shorter exposure is exposed for $1/16$ (for example) of the time as the next-shortest exposure, giving an exposure ratio of 16.

An important technical challenge that the methods presented herein addresses is that of obtaining good inference accuracy with high dynamic range scenes, without requiring a dataset of high dynamic range images for training, which could be very costly to obtain. At training time, a non-HDR dataset is used, and the model is made invariant to the absolute brightness of the images presented to it at inference time using data augmentation. The recapture methods presented herein allow existing non-HDR datasets, which may be more readily available or easier to acquire, to be used for training a HDR-capable inferencing system.

A given object in the fused high dynamic range image has a brightness range that is a function of the luminance of that object. Different objects in a high dynamic range scene may have very different brightness ranges. The network needs to perform with maximal accuracy (e.g., when locating or classifying an object, etc.) regardless of the brightness range of the object, or of the area in the image in which it is located. This may be achieved by varying the brightness of the non-HDR examples given to the network at training time, by applying a random gain to each image before it is presented to the network at training time. In some embodiments, this operation may be part of the traditional data augmentation operations (e.g., operation block 326 in FIG. 3, etc.) and/or only implemented for training networks for use cases where HDR images are fed to the neural network inference stage. With reference to the example above where the exposure ratio is 16, the gain would be randomly chosen within the range [N/16, N], where N is chosen such that the range of the image data presented to the network at training time matches the range of the fused high dynamic range image data that the network will receive at inference time.

The various embodiments may be able to allow for color invariance. Color casts due to incorrect white balance may have a negative impact on inference accuracy and robustness. When performing both training and inference on a standard color space such as sRGB, the standard approach is to provide white balance corrected images to the network at both training and inference time, in order to avoid color casts.

Further, cameras typically feature automatic white balance (AWB) algorithms that attempt to ensure color constancy regardless of the color temperature or spectral properties of the illuminant(s) in the scene. AWB algorithms attempt to determine, based on the content of the scene, the type (or at least the color temperature) of the illuminant that was used to illuminate the scene, and then make adjustments to the image so that neutral (white or grey) objects in the scene appear neutral in the processed image. Determining the type of the illuminant, or even estimating its color temperature based on the scene content, is an ill-posed problem and is prone to failure, which can result in strong color casts in the image. Consider also that there may be multiple illuminants in the scene, with differing spectral power distributions (SPDs) and color temperatures, further complicating the task of performing accurate white balance. There may be no global adjustment that may be made to the image that avoids color casts over all objects within the image.

The various methods presented herein avoid the pitfalls of white balancing by completely omitting white balance correction at inference time. They additionally use a data augmentation approach to ensure that the network performs well regardless of the spectral power distribution of the scene illuminant.

When images are formed by a color imaging sensor, the resulting images are not in any standard color space (since the image signal processing has not yet taken place). Instead, they are in a color space that depends not only on the scene illuminant, but also on the spectral response of the particular camera sensor's pixels. A color filter array (CFA) causes pixels at different spatial locations to have different spectral responses, which facilitates the production of color images. If the network is trained directly on images in camera color space, then images should also be presented in camera color space to the network at inference time, for improved accuracy.

When images are recaptured, the captured colors are not affected by the spectral power distribution of any illuminant, but rather by the spectral power distribution of the pixels of the display that was used during the recapture process. Data augmentation may be used to ensure that the model is invariant to the scene illuminant, such that it is not biased towards working optimally only when the spectral power distribution of the scene illuminant at inference time corresponds to the spectral power distribution of the display's pixels.

The data augmentation method presented herein consists of applying gains to the different color channels of a raw image, prior to presenting it to the model for training. A set of gains, one per color channel, may effectively represent a translation from the spectral power distribution of the display to the spectral power distribution of a given illuminant. One set of gains may be obtained for each illuminant that is likely to be encountered in the field. During training, data augmentation may be effected by choosing a set of gains at random, and applying it to each image before it is presented to the network.

Figure 13:
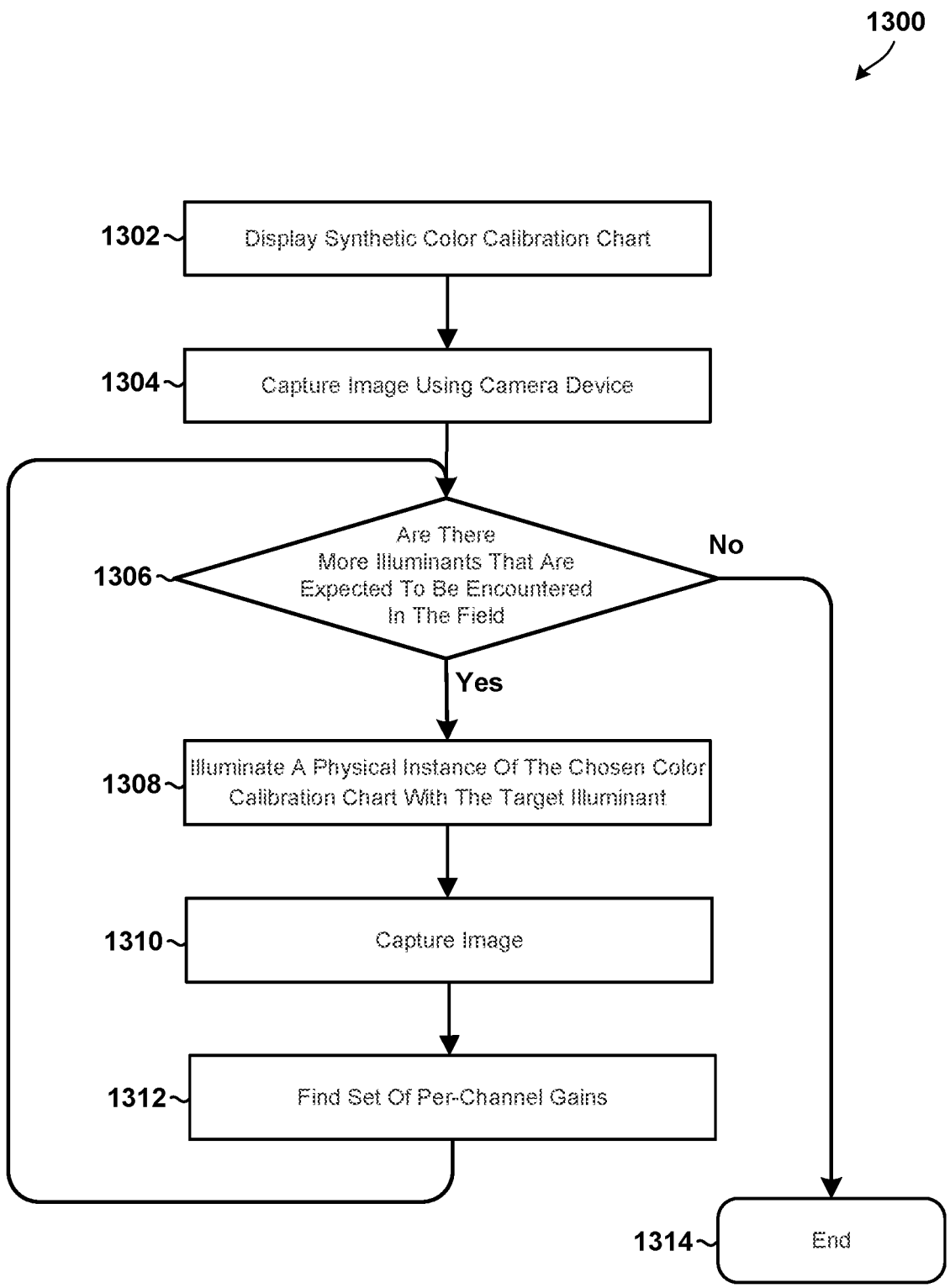
FIG. 13 is a process flow diagram illustrating a method of obtaining sets of gains that are suitable for applying to the different color channels of a raw image in accordance with the various embodiments.

FIG. 13 is a process flow diagram illustrating a method 1300 of allowing for color invariance and/or obtaining gains that are suitable for applying to the different color channels of a raw image in accordance with the various embodiments (e.g., in operation block 326 in FIG. 3). In block 1302, the display controller may display a synthetic color calibration chart (e.g., the X-Rite ColorChecker calibration chart, etc.). In block 1304, the camera 306 may capture the image. In determination block 1306, it is determined if there are more illuminants that are expected to be encounter in the field.

In response to determining that there are more illuminants that are expected to be encounter in the field (i.e., determination block 1306="Yes"), in operation 1308 a physical instance of the chosen color calibration chart may be illuminated with the target illuminant. In block 1310, the camera 306 may capture the image. In block 1312, the set of per-channel gains that best maps the colors from the image of the synthetic chart to the colors from the image of the real chart is determined.

In response to determining that there are no more illuminants expected to be encounter in the field (i.e., determination block 1306="No"), the process may exit, end, terminate, or finish in block 1314.

In an enhanced embodiment, a further reduction in bias may be obtained by picking more than one set of gains, and interpolating between them to produce a new set of gains to be multiplied by each channel. Indeed, a valid approach is to only obtain sets of gains for two illuminants, at the extremes of the color temperature ranges that are expected to be encountered, and interpolate between them using an interpolation factor, t, chosen at random for each image before presenting it to the network at training time.

The extent to which an image is in focus is yet another image attribute that may impact inference accuracy. Out-of-focus images may appear blurry compared to in-focus images. When an image is out of focus, information is not lost per se; rather the point spread function is changed such that the light from a particular point in the scene is distributed over a larger neighborhood of the imaging sensor. As with other image attributes, the distribution of the degree of focus of the images seen at training time should match the distribution seen at inference time.

It is also possible to use data augmentation to train the model to be invariant to the degree of focus. This may be accomplished by training the earlier layers of the network with subsets of the dataset that have been recaptured with different focus settings, using a method that is similar to the method used to make the model invariant to noise. The focus settings may be varied manually in the case of a manual focus lens, or programmatically in the case of an autofocus or actuator focused lens. In the case of a fixed focus lens, the focus may be varied by placing optical elements between the camera and the display.

The methods presented herein have many applications. For example, a consumer device such as a smartphone, which includes a camera that was sharply in focus when it left the factory, could have been dropped, or may have been subject to shock or vibrations during transport, impacting the focus of the captured images. By using a model that was trained to be focus-invariant, the impact of the impaired focus on the accuracy of any inference-based application running on the device may be mitigated.

There are many applications of the methods presented herein in the context of deploying cameras in space. During launch, the camera could be subject to extreme vibrations, which could impact the extent to which images captured by the camera are in focus. Focus invariance helps to mitigate any resulting drop in inference accuracy.

Another space-oriented application is in the area of earth observation satellites. It may be highly impractical, if not impossible, to validate the camera fully on earth, prior to launch. This is because the optics on earth observation satellites need to be focused at extreme distances, and as such they cannot be focused or tested using the methods normally adopted in terrestrial settings. Therefore, there may be a significant degree of uncertainty around the extent to which the camera will be in focus when it is deployed. The impact of this uncertainty is mitigated by the focus-invariance methodology presented herein.

The recapture methods described herein may not be applicable if the target device has a telescopic lens, such as those deployed in earth observation applications. The recaptured images would be blurred to an extreme degree, whereas the earth imagery captured when the camera is deployed is expected to be in focus. To address this, a substitute lens may be used at recapture time that may be in focus when the camera is positioned in front of the display device. The image subsets may be recaptured with varying focus and other data augmentation techniques as described herein. The lens may then be replaced with the application-specific lens prior to deployment.

The various methods described herein enable the creation of an inference model that is invariant to various attributes of the images it receives as input, allowing inference accuracy to be maintained across a wider range of operating conditions. However, these methods can also be used to train a model that is invariant to many of the characteristics of the camera's components. These characteristics include point spread function, and quantum efficiency (QE) which affects the Signal to Noise Ratio (SNR) of the sensor as well as color reproduction (since the quantum efficiency is different for the different filters in a color filter array). In the various embodiments, it is possible to deploy a single model across different devices, or across different revisions of a product with differing camera components, while maintaining accuracy from one device to another without the need to retrain the model.

Consider for example the Bayer 2×2 CFA arrangement, which is one of the most common form of CFA for color sensors. It is possible to train a model using a mixture of images recaptured by different cameras that have the Bayer CFA arrangement in common, yielding a single model that may be deployed on any of these sensor types with good inference accuracy. By training with images from a suitable representative set of cameras, the model can even be made to generalize to work well with Bayer sensors from which images were not included at training time.

As noted previously, noise, color, and focus invariance may be achieved without re-training the entire network, where only a subset of the training dataset is required. This is also true with respect to achieving camera invariance, meaning that it is not necessary to recapture the entire dataset for each of the cameras from the representative set.

When training a neural network, the best practice is to withhold a subset of the dataset to be used to validate the trained model, while ensuring that the validation set is not seen by the model during training. In addition to training the model on recaptured images, the methods described herein also validate the model on recaptured images.

The method presented herein, which is based around the use of recaptured datasets, is designed to minimize any gap in accuracy that can result due to the original validation dataset having a different distribution from the recaptured validation images, which come from the camera on the device itself. However, there needs to be a way to evaluate the methods, in order to prove that they provide the expected benefits compared to more traditional approaches. Therefore, a method for validating the model's accuracy once deployed on the actual device is required. The goal is to validate the entire system, including optics, imaging sensor, image preprocessor (including LUT, HDR Fusion (if present), resizer etc.), camera control algorithms, and the inference network itself. This is a form of validation 'gap analysis'—understanding and quantifying the gap in network performance between the lab validation (training time) and the performance on real hardware.

The various embodiments may leverage the hardware configuration that was developed for recapturing images. In order to measure the accuracy of the full system, images from the validation dataset may be displayed, and then captured with the target hardware (or a prototype thereof). The complete validation dataset may be iterated through, displaying and capturing the frames in sequence. The frame identification methods described above may be used to robustly ensure that each image in the validation dataset has been captured correctly, and to ensure that each displayed frame is processed for validation exactly once. The decoded frame identifiers may be used as an index to retrieve the ground truth information from a database. The network output (which is usually a tensor) may be used in conjunction with the ground truth to determine the accuracy of the network. The same metrics that were used to measure accuracy during the original offline training and validation may be used here, so that a comparison may be performed directly between the offline (training time) model accuracy versus online model accuracy.

The various embodiments may enable the frame identifiers to be decoded by modifying the device's firmware. Alternatively, if it is possible to access the camera's raw output such that it may be stored per frame, then the frames may be saved along with the corresponding output tensor, for offline recovery of the frame identifiers prior to validation. In this way, modification of the device's firmware may be avoided. This validation method may be used to validate all of the inference accuracy improvement techniques described herein, in addition to validating future techniques and methods. It may also serve as a general evaluation system for comparing different solutions or devices where any or all of the camera, imaging sensor, firmware and inference network may be different.

The various embodiments may dynamically change various aspects of the displayed image in order to validate the effect of inference accuracy of other components of the system, such as the auto exposure algorithm or a white balance algorithm that may be present. For example, the brightness of the display could be dynamically varied, or the color temperature of the images or of the display could be adjusted, as an embodiment is iterating through the validation dataset. Another approach is to programmatically control actuators, such that one or more optical filters (e.g., neutral density (ND) filters, color filters, etc.) may be inserted or removed in the space between the camera and the display as the validation dataset is displayed. The various embodiments may iterate through the dataset multiple times, varying the screen brightness, image color temperature, physical filter placement etc., in order to validate the system under different conditions, and to understand how various scene conditions will affect inference accuracy.

Figure 14:
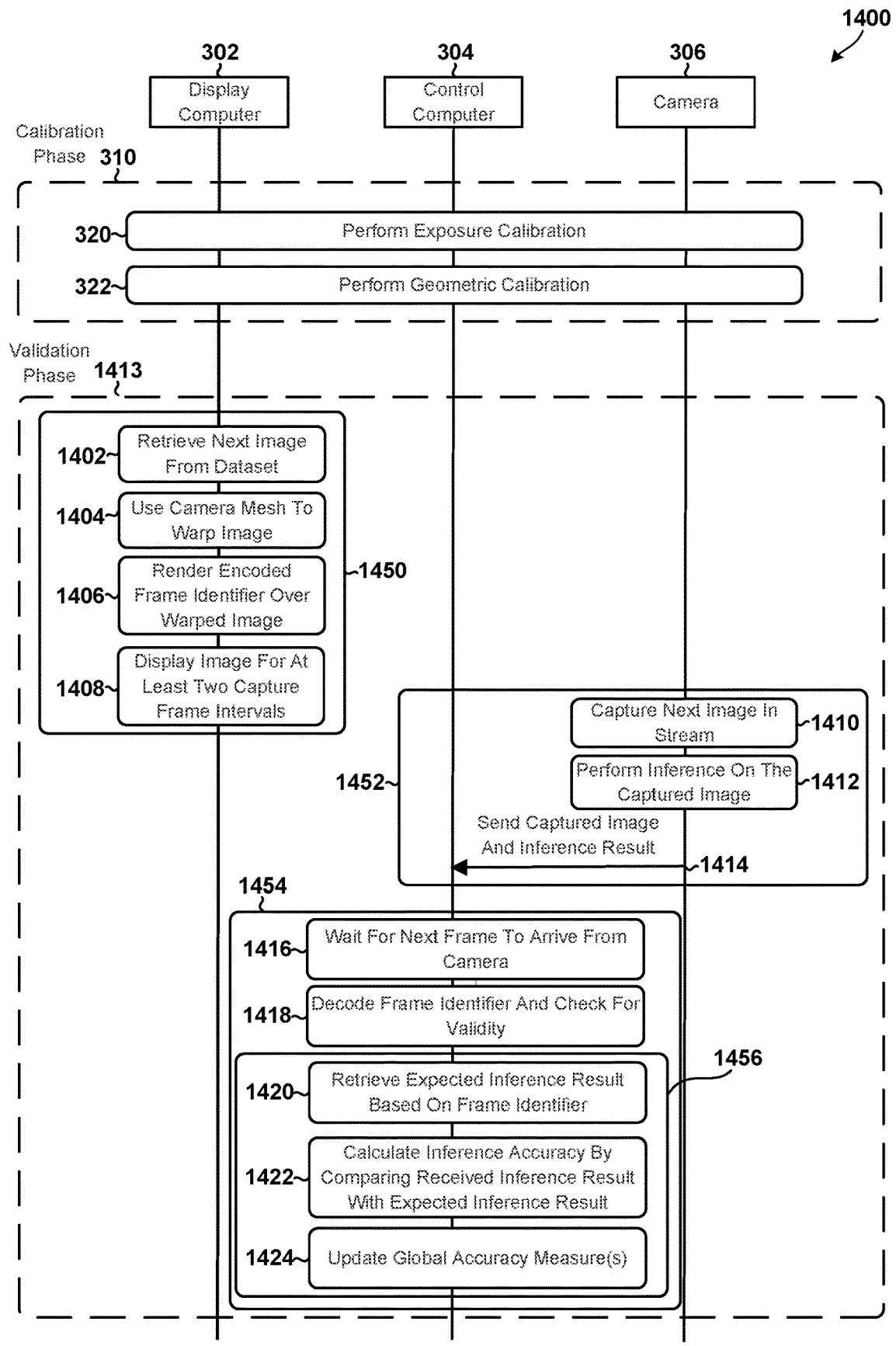
FIG. 14 is an activity diagram illustrating a method of performing inference accuracy validation in accordance with the various embodiments.

FIG. 14 is an activity diagram illustrating a method 1400 of performing inference accuracy validation in accordance with the various embodiments. Operations 1402-1422 form a validation phase 1413, and this occurs after the calibration phase 310 (as previously described in relation to FIG. 3, etc.).

In operation block 1402, the display computer 302 may retrieve the next image for displaying from the dataset. In operation block 1404, the display computer 302 may transform the retrieved image using the camera coordinate mesh. In operation block 1406, the display computer 302 may render the encoded frame identifier over the warped image. In operation 1408, the display computer 302 may display the image for at least two capture frame intervals. Operations 1402-1408 in loop 1450 may be performed repeatedly for each image in the dataset.

In operation block 1410, the camera 306 may capture the next image in the stream. In operation block 1412, the camera 306 may generate an inference result by performing inference on the captured image (e.g., by capturing the output from the convolutional neural network, etc.). In operation 1414, the camera 306 may send the captured image and the associated inference result to the control computer 304. Operations 1410-1414 in loop 1452 may be performed repeatedly until a user stops the camera 306.

In operation block 1416, the control computer 304 may wait for the next frame to arrive from the camera 306. In operation block 1418, the control computer 304 may decode the frame identifier and check its validity. The control computer 304 may perform the operations in block 1456 in response to determining that the decoded frame identifier is valid. For example, in operation block 1420, the control computer 304 may retrieve the expected inference result (e.g., the expected output from the convolutional neural network, etc.) for the image based on the frame identifier. In operation block 1422, the control computer 304 may calculate the inference accuracy by comparing the generated inference result with the expected inference result. In operation block 1424, the control computer 304 may update the global accuracy measure(s). Operations 1416-1424 in loop 1454 may be performed repeatedly until a user stops the control computer 304.

In an alternative embodiment, some or all of the operations performed by the control computer 304 may be performed by the camera 306 (e.g., if the control computer 304 is a processor in the camera, etc.).

In an embodiment, the three operations groups 1402-1408, 1410-1414, and 1416-1424 may all operate as three separate threads or processes running in parallel on the display computer 302, control computer 304, and camera 306 respectively because there is no explicit synchronization between them. This may improve the performance of an embodiment, because the display computer 302 operates at half (or less) of the capture device's capture framerate, so that the capture device is guaranteed to be able to keep up with the display computer 302. The control computer 304 needs to be able to process the captured frames as quickly as the capture device captures them and sends them to the control computer 304. After the entire dataset has been displayed by the display computer 302, the user may explicitly stop the capture device and the control computer 304.

Some embodiments may include methods of training a neural network model by recapturing existing datasets, which may include performing calibration, recapturing at least one image in the dataset, and training the model using the recaptured images.

In some embodiments, performing the calibration may include performing exposure calibration, which may include requesting a display computer to display an image, requesting a camera device to capture an image of the displayed image, receiving the captured image, counting the number of overexposed pixels, adjusting the camera exposure parameters in response to determining that the number of overexposed pixels is not within a target range, and sending the camera exposure parameters to the camera device for future image captures.

In some embodiments, performing the calibration may include performing geometric calibration, which may include requesting a display computer to display an image, requesting a camera device to capture an image of the displayed image, receiving the captured image, overlaying the captured image with a crosshair, and moving/aligning the camera to align it in response to determining that the crosshair is aligned with a test pattern in the displayed image.

In some embodiments, the method may further include generating a synthetic calibration image, requesting a display computer to display the synthetic calibration image, requesting a camera device to capture an image of the displayed image, receiving the captured image, saving the captured image, performing coarse geometric mapping calibration using one or more captured images, creating a camera mesh by refining the coarse geometric mapping, and inverting the camera mesh to produce a display mesh.

In some embodiments, recapturing at least one image in the dataset may include requesting a display computer to display an image identified using an image identifier, retrieving, in the display controller, the requested image from the dataset using the received image identifier, using a camera mesh to warp the image, displaying the warped image, requesting, in the control computer, a camera device to capture an image of the displayed image, receiving the captured image, cropping the captured image, and saving the cropped image to the recaptured dataset.

In some embodiments, recapturing at least one image in the dataset may include retrieving, in a display computer, an image from a dataset, using a camera mesh to warp the image, rendering an encoded frame identifier over the warped image, displaying the image for at least two capture frame intervals of the camera device, capturing an image in a camera device, receiving the captured image in a control computer, decoding the frame identifier, retrieving the image metadata using the decoded frame identifier, cropping the captured image, and saving the cropped image to the recaptured dataset.

In some embodiments, recapturing at least one image in the dataset may include recapturing the full dataset, and recapturing subsets of the full dataset. In some embodiments, recapturing subsets of the full dataset may include recapturing images based upon at least one of noise invariance, brightness invariance high dynamic range scenes, color invariance, focus invariance, and/or camera invariance.

In some embodiments, the method may further include deploying the trained model to a camera device, capturing an image in a camera device, and performing inference using the new model.

In some embodiments, the method may further include retrieving, in a display computer, an image from a dataset, using a camera mesh to warp the image, rendering an encoded frame identifier over the warped image, displaying the image for at least two capture frame intervals of the camera device, capturing an image in a camera device, generating an inference result by performing inference on the captured image, receiving the captured image and an inference result in a control computer, decoding the frame identifier, retrieving the expected inference result for the image based upon the frame identifier, calculating the inference accuracy by comparing the generated inference result and the expected inference result, and updating at least one global accuracy.

FIGS. 15-19 illustrate methods 1500, 1600, 1700, 1800, 1900 of tailoring a neural network model to a camera in accordance with the various embodiments (e.g., embodiments described above with reference to FIGS. 1-14). Methods 1500, 1600, 1700, 1800, and 1900 may be performed by a processor in a computing device (e.g., display computer, control computer, camera, etc.).

Figure 15:
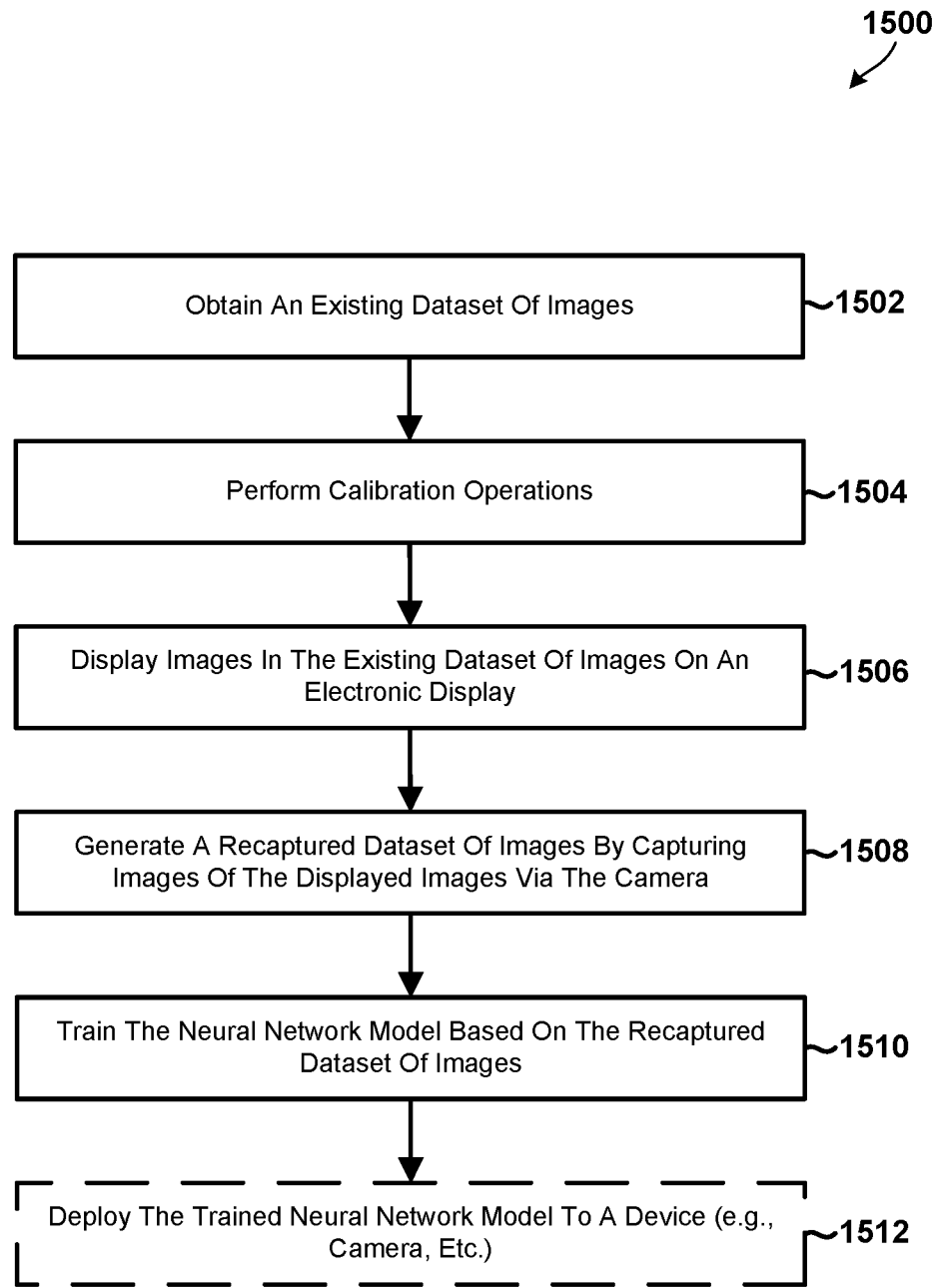
FIG. 15-19 are process flow diagrams illustrating methods of tailoring a neural network model to a camera in accordance with the various embodiments.

With reference to FIG. 15, in block 1502, the processor may obtain an existing dataset of images. In block 1504, the processor may perform calibration operations. In some embodiments, performing the calibration operations in block 1504 may include performing exposure calibration operations (e.g., using a white image, etc.) and/or geometric calibration operations (e.g., using an image with a crosshair, etc.).

In some embodiments, performing exposure calibration operations may include displaying a first image on the electronic display, capturing an image of the displayed first image, determining a number of overexposed pixels included in the captured image, determining whether the number of overexposed pixels included in the captured image is within a target range, adjusting one or more camera exposure parameters in response to determining that the number of overexposed pixels is not within the target range, and sending the adjusted camera exposure parameters to the camera for future image captures.

In some embodiments, performing geometric calibration operations may include displaying a first image on the electronic display, capturing an image of the displayed first image, overlaying the captured image with a marker, and adjusting a position or orientation of the camera relative to the electronic display so that the marker in the captured image is aligned with a center of the electronic display.

In block 1506, the processor may display images in the existing dataset of images on an electronic display. For example, the processor may cause a display computer to display the images on an electronic display of the display computer. In block 1508, the processor may generate a recaptured dataset of images by capturing images of the displayed images via the camera. For example, the processor may cause a camera device to capture the images of the displayed images.

In some embodiments, displaying the images and generating the recaptured dataset in blocks 1506 and 1508 may include using an image identifier to identify an image in the existing dataset of images, retrieving the requested image from the existing dataset of images using the received image identifier, generating a warped image by using a camera mesh to warp the retrieved image, displaying the warped image, capturing an image of the displayed warped image, cropping the captured image of the displayed warped image, and saving the cropped image to the recaptured dataset of images.

In some embodiments, displaying the images and generating the recaptured dataset in blocks 1506 and 1508 may include retrieving an image from the existing dataset of images, generating a warped image by using a camera mesh to warp the retrieved image, rendering the warped image and an encoded frame identifier over the warped image, displaying the warped image and the encoded frame identifier, capturing an image of the warped image and the encoded frame identifier, decoding the encoded frame identifier, using the decoded frame identifier to retrieve image metadata (used to relate the captured image to the dataset), cropping the captured image of the warped image, and saving the cropped image to the recaptured dataset of images. In some embodiments, displaying and capturing the image of the warped image and the encoded frame identifier may include displaying and recapturing images at a rate of up to half of a frame rate of the camera.

In block 1510, the processor may train the neural network model based on the recaptured dataset of images. In optional block 1512, the processor may deploy the trained neural network model to a device (e.g., camera, etc.).

Figure 16:
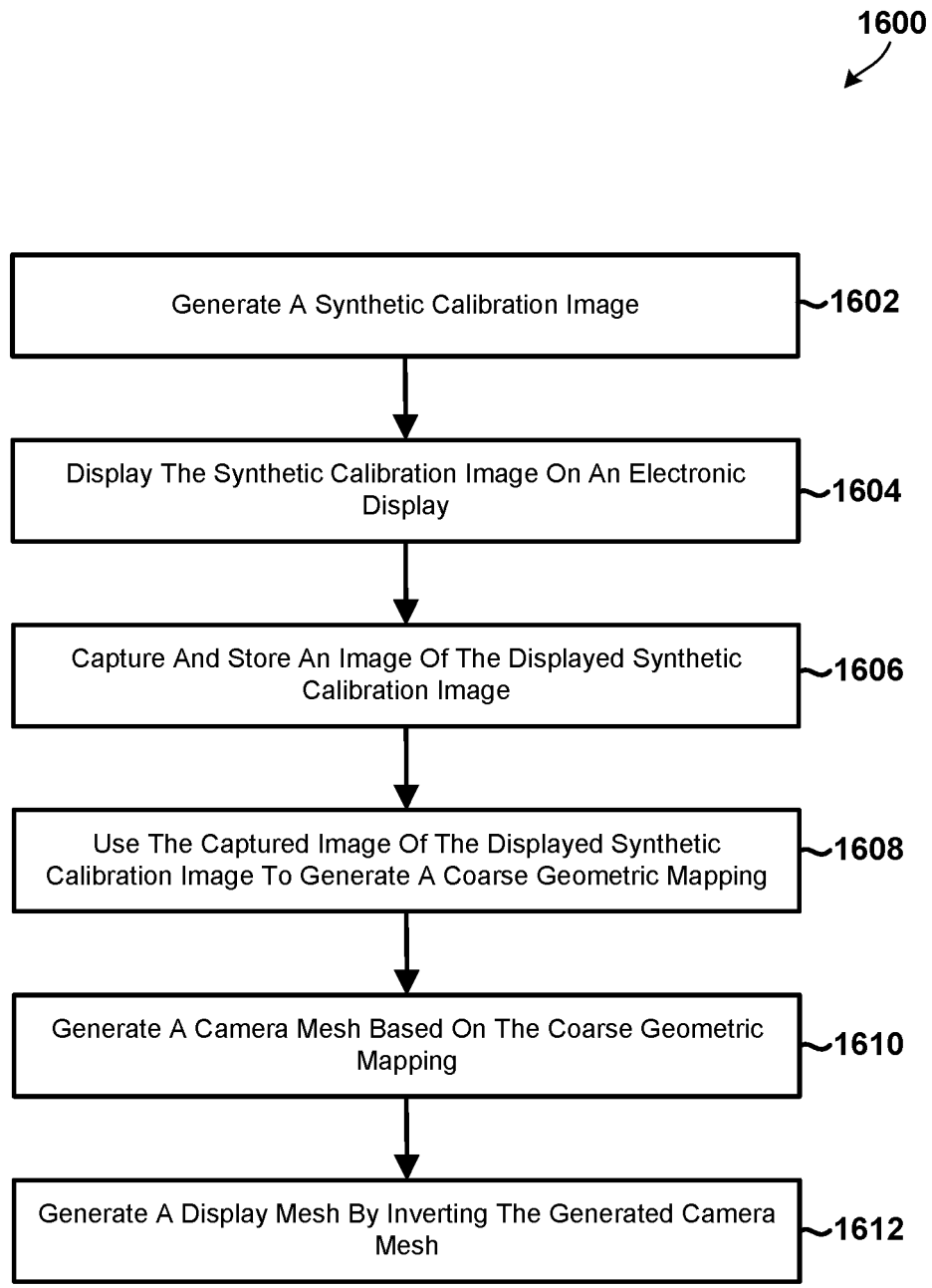

With reference to FIG. 16, in block 1602, the processor may generate a synthetic calibration image. In block 1604, the processor may display the synthetic calibration image on an electronic display. For example, as discussed above with reference to FIG. 6, the processor may send a request to a display computer to cause the display computer to display a synthetic calibration image.

In block 1606, the processor may capture and store an image of the displayed synthetic calibration image. In block 1608, the processor may use the captured image of the displayed synthetic calibration image to generate a coarse geometric mapping. In block 1610, the processor may generate a camera mesh based on the coarse geometric mapping. In block 1612, the processor may generate a display mesh by inverting the generated camera mesh.

Figure 17:
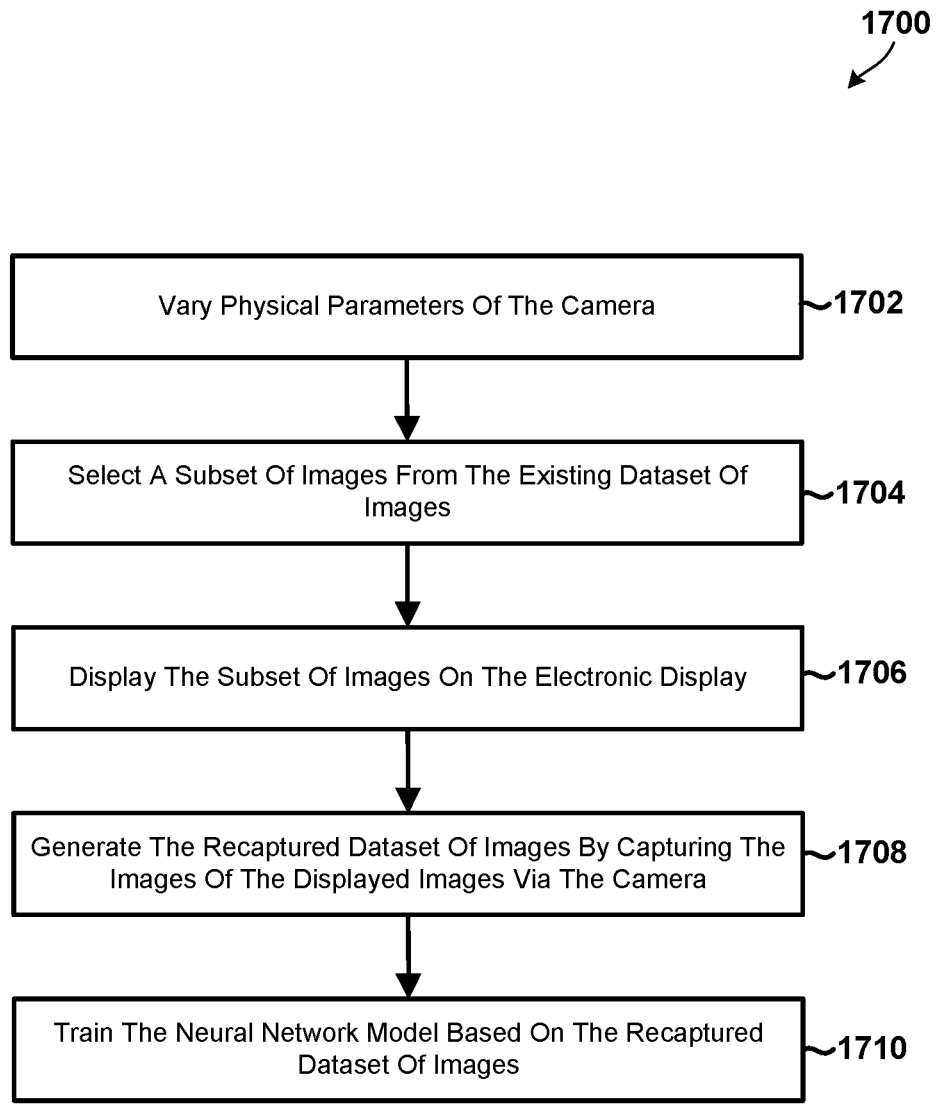

With reference to FIG. 17, in block 1702, the processor may vary the physical parameters of the camera (e.g., to achieve noise invariance, brightness invariance, color invariance, focus invariance, camera invariance, etc.). For example, to achieve camera invariance, the processor may vary the physical parameters of the camera in block 1702 by using a different camera.

To achieve noise invariance, the processor may vary the physical parameters of the camera in block 1702 by using a different sensor gain in the camera. To achieve focus invariance, the processor may vary the physical parameters of the camera in block 1702 by using a different focus in the camera. In these embodiments, training the neural network model based on the recaptured dataset of images in block 1510 of FIG. 15 may include retraining at least one earlier/preceding layer in the neural network model and freezing all other layers of the neural network model. Layer freezing is a neural network technique that imposes a restriction such that certain layers of the neural network cannot change during the re-training process. Generally, the restriction may be imposed by freezing a layer during training, meaning that the weights in that layer are not altered during the training process. All weight values in the frozen layer(s) after neural network retraining are exactly equal to their values in the original neural network before retraining occurred. The effect of freezing a layer in the neural network during re-training is to reduce somewhat the flexibility of the training process, but since all weights not in frozen layers can still change, the neural network can compensate for this layer freezing (neural plasticity).

Returning to FIG. 17, in block 1704, the processor may select a subset of images from the existing dataset of images. In block 1706, the processor may display the subset of images on the electronic display. In block 1708, the processor may generate the recaptured dataset of images by capturing the images of the displayed images via the camera. In some embodiments, to achieve brightness invariance, in block 1708 the processor may capture two images of a single displayed image using different exposures, scale at least one of the captured two images, and merge the captured two images. In block 1710, the processor may train the neural network model based on the recaptured dataset of images.

Figure 18:
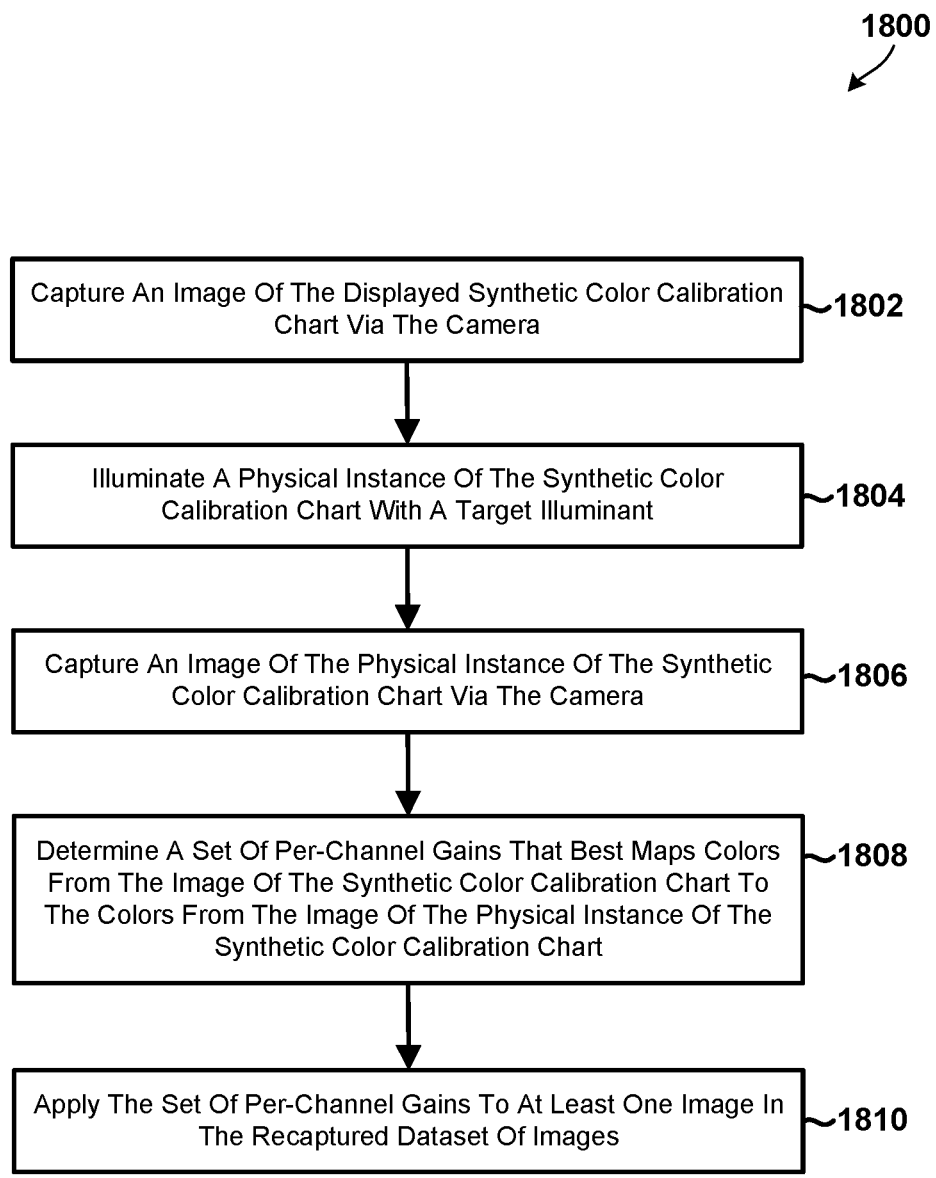

With reference to FIG. 18, in block 1802, the processor may capture an image of the displayed synthetic color calibration chart via the camera. In block 1804, the processor may illuminate a physical instance of the synthetic color calibration chart with a target illuminant. In block 1806, the processor may capture an image of the physical instance of the synthetic color calibration chart via the camera. In block 1808, the processor may determine a set of per-channel gains that best maps colors from the image of the synthetic color calibration chart to the colors from the image of the physical instance of the synthetic color calibration chart. In block 1810, the processor may apply the set of per-channel gains to at least one image in the recaptured dataset of images.

Figure 19:
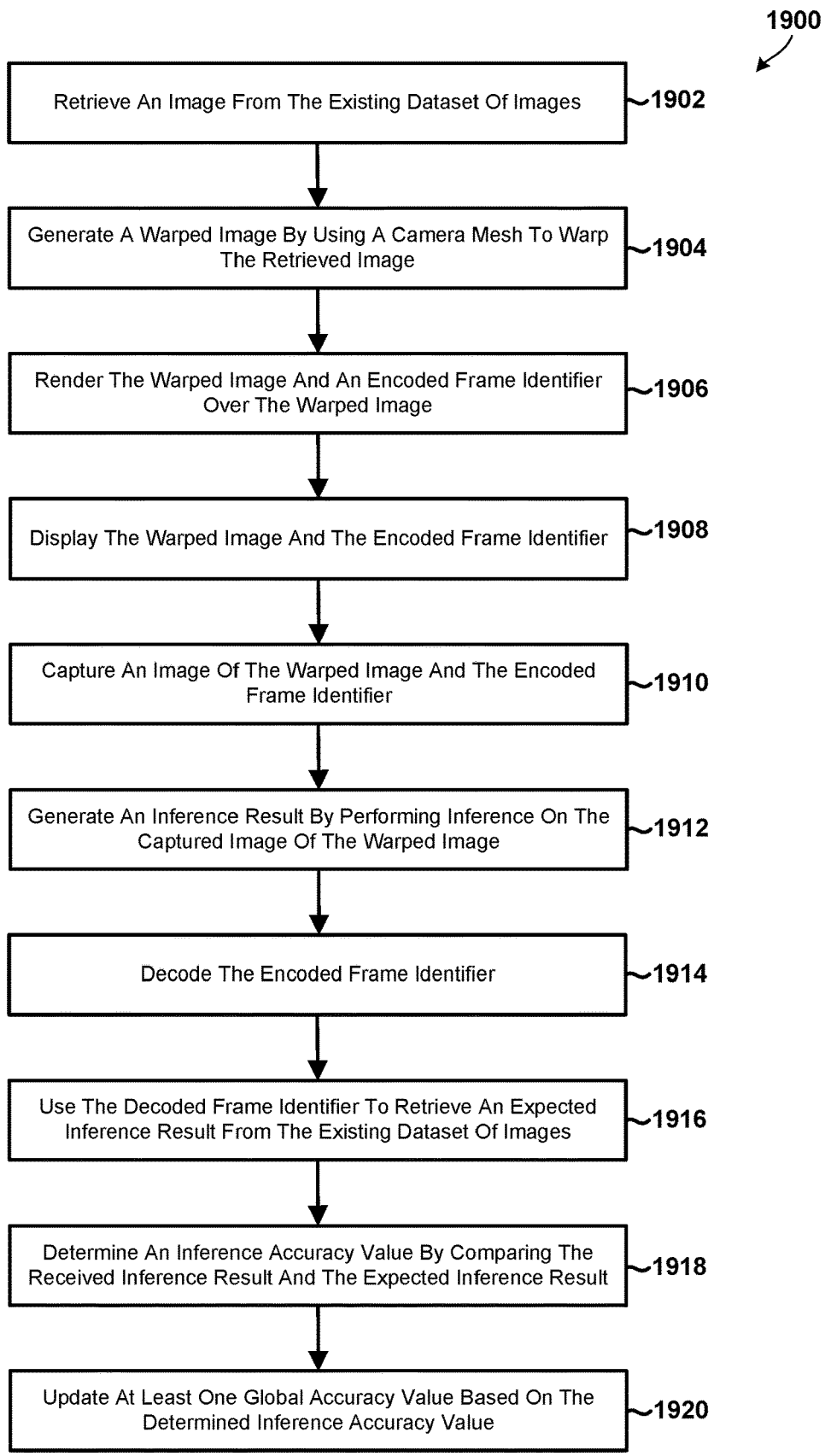

With reference to FIG. 19, in block 1902, the processor may retrieve an image from the existing dataset of images. In block 1904, the processor may generate a warped image by using a camera mesh to warp the retrieved image. In block 1906, the processor may render the warped image and an encoded frame identifier over the warped image. In block 1908, the processor may display the warped image and the encoded frame identifier.

In block 1910, the processor may capture an image of the warped image and the encoded frame identifier. In block 1912, the processor may generate an inference result by performing inference on the captured image of the warped image. In block 1914, the processor may decode the encoded frame identifier. In block 1916, the processor may use the decoded frame identifier to retrieve an expected inference result from the existing dataset of images. In block 1918, the processor may determine an inference accuracy value by comparing the generated inference result and the expected inference result. In block 1920, the processor may update at least one global accuracy value based on the determined inference accuracy value.

Figure 20:
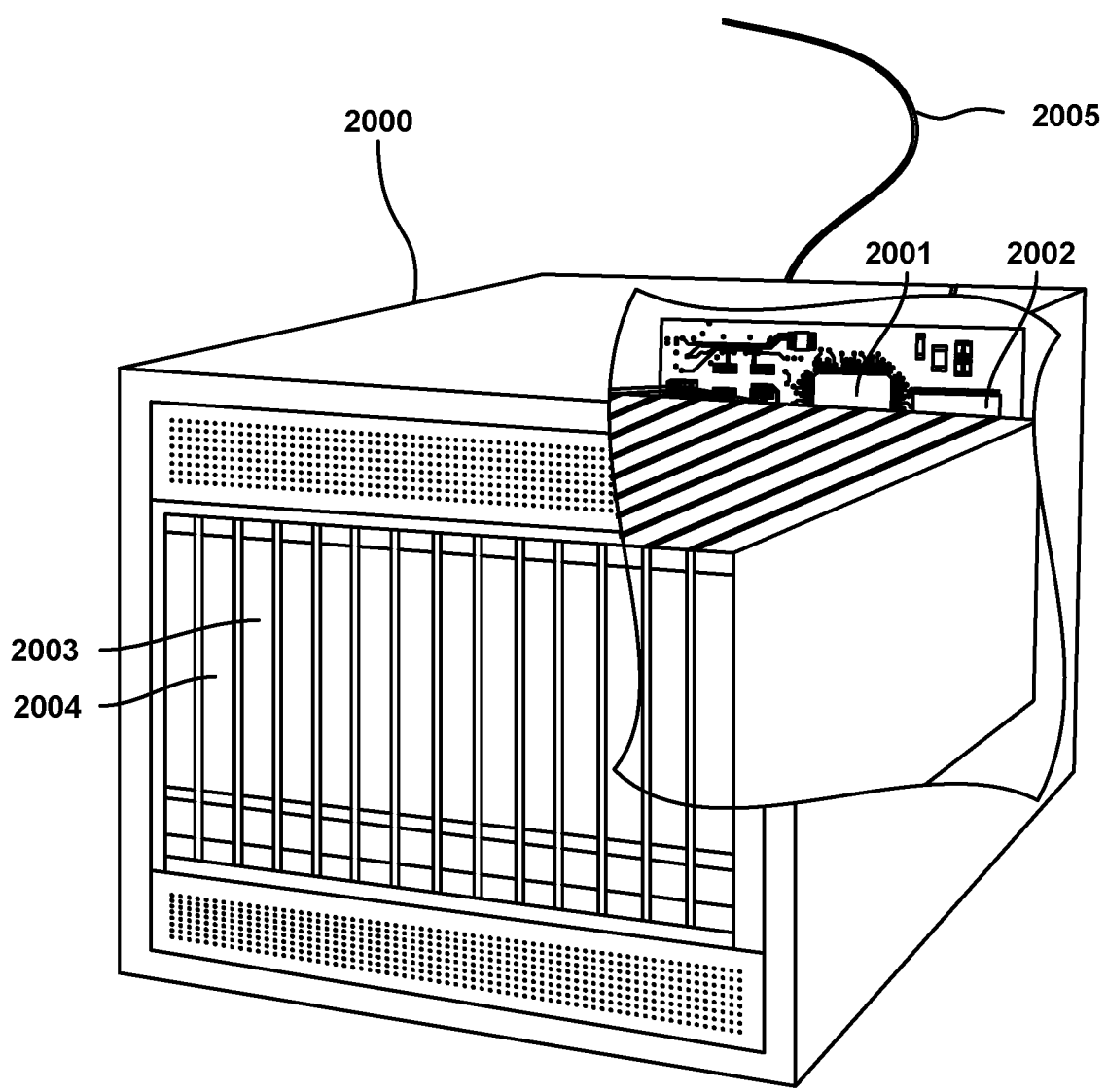
FIG. 20 is a component diagram of server suitable for use with the various embodiments.

The various embodiments may be implemented on any of a variety of commercially available server devices, such as the server 2000 illustrated in FIG. 20. Such a server 2000 typically includes a processor 2001 coupled to volatile memory 2002 and a large capacity nonvolatile memory, such as a disk drive 2003. The server 2000 may also include a floppy disc drive, compact disc (CD) or DVD disc drive coupled to the processor 2001. The server 2000 may also include network access ports 2004 coupled to the processor 2001 for establishing data connections with a network 2005, such as a local area network coupled to other operator network computers and servers.

The processor 2001 may be any programmable microprocessor, microcomputer or multiple processor chip or chips that may be configured by software instructions (applications) to perform a variety of functions, including the functions of the various embodiments described below. Multiple processors 2001 may be provided, such as one processor dedicated to wireless communication functions and one processor dedicated to running other applications. Typically, software applications may be stored in the internal memory 2002, 2003 before they are accessed and loaded into the processor 2001. The processor 2001 may include internal memory sufficient to store the application software instructions.

As used in this application, the terms "component," "system," and the like may refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The foregoing method descriptions and the process flow diagrams are provided merely as illustrative examples and are not intended to require or imply that the blocks of the various aspects must be performed in the order presented. As will be appreciated by one of skill in the art the order of steps in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory server-readable or processor-readable storage medium. The steps of a method or algorithm disclosed herein may be embodied in a processor-executable software module, which may reside on a non-transitory processor-readable or server-readable storage medium. Non-transitory processor-readable and server-readable media may be any available storage media that may be accessed by a computer or a processor of a computing device. By way of example, and not limitation, such non-transitory processor-readable or server-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a server or processor of a server. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory server-readable media. Additionally, the operations of a method or algorithm may reside as one or any combination or set of codes and/or instructions on a non-transitory processor-readable medium and/or non-transitory server-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

The invention claimed is:

1. A method of tailoring a neural network model to a camera, comprising:
   obtaining, by a processor in a control device, an existing dataset of images;
   performing calibration operations;
   displaying images in the existing dataset of images on an electronic display;
   capturing images of the displayed images via the camera;
   generating a recaptured dataset of images based on the captured images, wherein generating the recaptured dataset of images includes applying black level subtraction, a gamma adjustment, or a tone curve adjustment to the captured images; and
   training the neural network model based on the recaptured dataset of images.

2. The method of claim 1, further comprising deploying the trained neural network model to the camera.

3. The method of claim 1, wherein:
   displaying the images in the existing dataset of images on the electronic display comprises causing a display computer to display the images in the existing dataset of images on the electronic display of the display computer; and
   capturing images of the displayed images via the camera comprises causing a camera device to capture the images of the displayed images on the electronic display of the display computer.

4. The method of claim 1, wherein performing the calibration operations comprises performing exposure calibration operations comprising:
   displaying a first image on the electronic display;
   capturing an image of the displayed first image;
   determining a number of overexposed pixels included in the captured image;
   determining whether the number of overexposed pixels included in the captured image is within a target range;
   adjusting one or more camera exposure parameters in response to determining that the number of overexposed pixels is not within the target range; and
   sending the adjusted camera exposure parameters to the camera for future image captures.

5. The method of claim 1, wherein performing the calibration operations comprises performing geometric calibration operations comprising:
   displaying a first image on the electronic display;
   capturing an image of the displayed first image;
   overlaying the captured image with a marker; and
   adjusting a position or orientation of the camera relative to the electronic display so that the marker in the captured image is aligned with a center of the electronic display.

6. The method of claim 1, wherein displaying the images in the existing dataset of images on the electronic display and generating the recaptured dataset of images based on the captured images comprises:
   using an image identifier to identify an image in the existing dataset of images;
   retrieving the requested image from the existing dataset of images using the received image identifier;
   generating a warped image by using a camera mesh to warp the retrieved image;
   displaying the warped image;
   capturing an image of the displayed warped image;
   cropping the captured image of the displayed warped image; and
   saving the cropped image to the recaptured dataset of images.

7. The method of claim 1, wherein displaying the images in the existing dataset of images on the electronic display and generating the recaptured dataset of images based on the captured images comprises:
   retrieving an image from the existing dataset of images;
   generating a warped image by using a camera mesh to warp the retrieved image;
   rendering the warped image and an encoded frame identifier over the warped image;
   displaying the warped image and the encoded frame identifier;
   capturing an image of the warped image and the encoded frame identifier;
   decoding the encoded frame identifier;
   using the decoded frame identifier to retrieve image metadata;
   cropping the captured image of the warped image; and
   saving the cropped image to the recaptured dataset of images.

8. The method of claim 1, further comprising:
   varying physical parameters of the camera;
   selecting a subset of images from the existing dataset of images;
   displaying the subset of images on the electronic display;
   capturing images of the displayed subset of images via the camera;
   generating the recaptured dataset of images based on the captured images; and
   training the neural network model based on the recaptured dataset of images.

9. The method of claim 1, further comprising:
   displaying a synthetic color calibration chart on the electronic display;
   capturing an image of the displayed synthetic color calibration chart via the camera;

illuminating a physical instance of the synthetic color calibration chart with a target illuminant;
capturing an image of the physical instance of the synthetic color calibration chart via the camera;
determining a set of per-channel gains that best maps colors from the image of the synthetic color calibration chart to the colors from the image of the physical instance of the synthetic color calibration chart; and
applying the set of per-channel gains to at least one image in the recaptured dataset of images.

10. The method of claim 1, further comprising:
retrieving an image from the existing dataset of images;
generating a warped image by using a camera mesh to warp the retrieved image;
rendering the warped image and an encoded frame identifier over the warped image;
displaying the warped image and the encoded frame identifier;
capturing an image of the warped image and the encoded frame identifier;
generating an inference result by performing inference on the captured image of the warped image;
decoding the encoded frame identifier;
using the decoded frame identifier to retrieve an expected inference result from the existing dataset of images;
determining an inference accuracy value by comparing the generated inference result and the expected inference result; and
updating at least one global accuracy value based on the determined inference accuracy value.

11. The method of claim 5, further comprising:
generating a synthetic calibration image;
displaying the synthetic calibration image on the electronic display;
capturing and storing an image of the displayed synthetic calibration image;
using the captured image of the displayed synthetic calibration image to generate a coarse geometric mapping;
generating a camera mesh based on the coarse geometric mapping; and
generating a display mesh by inverting the generated camera mesh.

12. The method of claim 7, wherein displaying the warped image and the encoded frame identifier comprises displaying and recapturing images at a rate of up to half of a frame rate of the camera.

13. The method of claim 8, wherein:
varying the physical parameters of the camera comprises using a different sensor gain in the camera; and
training the neural network model based on the recaptured dataset of images comprises:
retraining at least one earlier layer in the neural network model; and
freezing all other layers of the neural network model.

14. The method of claim 8, wherein generating the recaptured dataset of images based on the captured images comprises:
capturing two images of a single displayed image using different exposures;
scaling at least one of the captured two images; and
merging the captured two images.

15. The method of claim 8, wherein:
varying the physical parameters of the camera comprises using a different focus in the camera; and
training the neural network model based on the recaptured dataset of images comprises:
retraining at least one earlier layer in the neural network model; and
freezing all other layers of the neural network model.

16. The method of claim 8, wherein varying the physical parameters of the camera comprises using a different camera.

17. A computing device, comprising:
a processor configured with processor-executable instructions to perform operations comprising:
obtaining an existing dataset of images;
performing calibration operations;
displaying images in the existing dataset of images on an electronic display;
capturing images of the displayed images via the camera;
generating a recaptured dataset of images based on the captured images, wherein generating the recaptured dataset of images includes applying black level subtraction, a gamma adjustment, or a tone curve adjustment to the captured images; and
training a neural network model based on the recaptured dataset of images.

18. The computing device of claim 17, wherein the processor is configured with processor-executable instructions to perform operations further comprising deploying the trained neural network model to the camera.

19. A non-transitory computer readable storage medium having stored thereon processor-executable software instructions configured to cause a processor to perform operations for tailoring a neural network model to a camera, the operations comprising:
obtaining an existing dataset of images;
performing calibration operations;
displaying images in the existing dataset of images on an electronic display;
capturing images of the displayed images via the camera;
generating a recaptured dataset of images based on the captured images, wherein generating the recaptured dataset of images includes applying black level subtraction, a gamma adjustment, or a tone curve adjustment to the captured images; and
training the neural network model based on the recaptured dataset of images.

20. The non-transitory computer readable storage medium of claim 19, wherein the stored processor-executable instructions are configured to cause a processor to perform operations further comprising deploying the trained neural network model to the camera.

* * * * *